US012803925B2

(12) United States Patent
Hong et al.

(10) Patent No.: US 12,803,925 B2
(45) Date of Patent: Nov. 17, 2026

(54) JOINT TRAFFIC ROUTING AND SCHEDULING METHOD FOR REMOVING NON-DETERMINISTIC INTERRUPT FOR TSN NETWORK USED IN INDUSTRIAL IOT

(71) Applicant: NESTFIELD CO,. LTD, Ansan-si (KR)

(72) Inventors: Seung Ho Hong, Seoul (KR); Yuting Li, Wuhan City (CN)

(73) Assignee: NESTFIELD CO., LTD., Ansan-si (KR)

(*) Notice: Subject to any disclaimer, the term of this patent is extended or adjusted under 35 U.S.C. 154(b) by 332 days.

(21) Appl. No.: 18/697,782

(22) PCT Filed: Oct. 20, 2022

(86) PCT No.: PCT/KR2022/016062
§ 371 (c)(1),
(2) Date: Oct. 16, 2024

(87) PCT Pub. No.: WO2023/132443
PCT Pub. Date: Jul. 13, 2023

(65) Prior Publication Data

US 2025/0112873 A1 Apr. 3, 2025

(30) Foreign Application Priority Data

Jan. 4, 2022 (KR) ........................ 10-2022-0000811

(51) Int. Cl.
*H04L 47/6275* (2022.01)
*H04L 45/02* (2022.01)
(Continued)

(52) U.S. Cl.
CPC ........ *H04L 47/6275* (2013.01); *H04L 45/125* (2013.01); *H04L 45/28* (2013.01)

(58) Field of Classification Search
CPC ... H04L 47/6275; H04L 45/125; H04L 45/28; H04L 67/12; H04L 45/123; H04L 45/3065; H04L 45/02; H04L 47/522; Y02P 90/02
See application file for complete search history.

(56) References Cited

U.S. PATENT DOCUMENTS 9,553,794 B1 * 1/2017 Zolla ........................ H04L 45/02
2021/0306910 A1 9/2021 Guo et al.
(Continued)

FOREIGN PATENT DOCUMENTS

EP 1 035 751 A2 9/2000
EP 3869752 A1 * 8/2021 ............. H04L 45/12
(Continued)

OTHER PUBLICATIONS

Title: Joint Traffic Routing and Scheduling Algorithm Eliminating the Nondeterministic Interruption Author: Li et al. Publisher: IEEE Internet of Things Journal (Year: 2022).*
(Continued)

*Primary Examiner* — Kamal M Hossain
(74) *Attorney, Agent, or Firm* — Goldilocks ZONE IP LAW

(57) ABSTRACT

The present invention proposes a novel joint traffic routing and scheduling method for computing routes for time-critical flows and constituting the schedules. The validity of the proposed method has been verified using a random synthetic test scenario. The simulation results demonstrate that the real-time requirements of time-critical traffic could be guaranteed with the method of the present invention. Subsequently, the scalability of the proposed method has been evaluated from the perspective of the number of flows that can be scheduled and the network size. The results indicate that the computational times for 4000 flows in the realistic industrial network topology and random network
(Continued)

topologies (with up to 21 switches and 105 end stations) are at the sub-second level, which indicate the perfect scalability of the proposed method.

4 Claims, 9 Drawing Sheets

(51) Int. Cl.

| | |
|---|---|
| ***H04L 45/12*** | (2022.01) |
| ***H04L 45/125*** | (2022.01) |
| ***H04L 45/28*** | (2022.01) |
| ***H04L 47/52*** | (2022.01) |
| *H04L 45/302* | (2022.01) |
| *H04L 67/12* | (2022.01) |

(56) References Cited

U.S. PATENT DOCUMENTS

| | | | | |
|---|---|---|---|---|
| 2024/0098033 | A1* | 3/2024 | Hong | H04L 47/283 |
| 2024/0406098 | A1* | 12/2024 | Ben Hadj Said | H04L 47/28 |

FOREIGN PATENT DOCUMENTS

| | | | |
|---|---|---|---|
| JP | 2021-136688 | A | 9/2021 |
| KR | 10-2020-0014950 | A | 2/2020 |
| KR | 10-2021-0018990 | A | 2/2021 |
| KR | 10-2021-0044683 | A | 4/2021 |
| KR | 10-2021-0046068 | A | 4/2021 |
| WO | 2020 200405 | A1 | 10/2020 |
| WO | 2021/075671 | A1 | 4/2021 |

OTHER PUBLICATIONS

Abdullah Alnajim, et al., Incremental Path-Selection and Scheduling for Time-Sensitive Networks, pp. 1-3, USA.

A communication of office Action of European search report of application No./Patent No. 22918980.8-1218 / 4395264 PCT/KR2022016062 issued on Dec. 18, 2024, which corresponds to this application.

* cited by examiner (a) Using $\lceil \sum_{f_i \in F_l} (1/\beta_i) \rceil$ (b) Using Eq. 12

JOINT TRAFFIC ROUTING AND SCHEDULING METHOD FOR REMOVING NON-DETERMINISTIC INTERRUPT FOR TSN NETWORK USED IN INDUSTRIAL IOT

TECHNICAL FIELD

The present invention relates to routing and scheduling technologies for the traffic, and in more detail, relates to a joint traffic routing and a scheduling method in which a real-time requirement of traffic where timing is important is ensured and has network scalability.

BACKGROUND

In industrial automation systems, reliable information exchange among various controllers, sensors, and actuators is an important mechanism to ensure system stability. In order to realize information exchange, multiple industrial communication solutions (i.e., Fieldbus systems and Industrial Ethernet protocols) have been used over the past decades.

These legacy industrial communication solutions, which are applied in lower layers of the hierarchical industrial automation architecture (as illustrated in FIG. 1), are largely incompatible with each other. This is known as manufacturer lock-in, resulting in unnecessary expense. It has been challenging to interconnect the Information Technology (IT) system in the upper layers of the automation architecture with the Operation Technology (OT) system in the lower layers of the automation architecture, which is commonly achieved using gateways.

FIG. 1 illustrates a hierarchical architecture of a general industrial automation system.

In FIG. 1, PLC represents a programmable logic controller, SCADA represents supervisory control and data acquisition, MES represents manufacturing execution system, ERP represents enterprise resource planning.

The industrial automation system is now undergoing a dramatic change with the advent of the recent Industry 4.0 movement, resulting in a new flatter automation architecture called Industrial Internet of Things (IIoT), as shown in FIG. 2. This flatter hierarchy requires the coexistence of IT and OT systems and breaks down the communication barriers between IT and OT systems. The new requirements of IIoT (e.g., convergence, deterministic latency, and IP access down to the field devices) cannot be satisfied by the legacy industrial communication solutions. Thus, a further evolution of industrial communication is necessary and reasonable.

Recently, Time-Sensitive Networking (TSN) has been developed by the IEEE 802.1 Task Group. TSN standards represent a series of improvements to standard Ethernet that facilitate real-time communication in IEEE 802.1 networks, including distributed clock synchronization, scheduled traffic enhancement, frame preemption, and path control and reservation. TSN is considered a promising real-time communication solution to satisfy the above-mentioned requirements of IIoT.

TSN provides the timed-gate mechanism and explicit control over the routing mechanism, but the routing and scheduling methods are beyond the scope of the TSN standards. For these mechanisms to operate properly, routing and scheduling methods must be developed. Currently, a few studies have been conducted to solve the TSN scheduling problem, e.g., using satisfiability modulo theories (SMT) or heuristic algorithms.

Those studies assumed that the routes of the flows were provided in advance. The separation of the routing process and scheduling process reduces the solution space. Several studies considered routing and scheduling for time-triggered networks. However, the computational time is still long and makes their practical use difficult.

DETAILED DESCRIPTION OF THE INVENTION

Problems to be Solved

The present invention is to overcome the above-described problem, and an object of the present invention is to provide a new and practical joint traffic routing and scheduling method.

Means to Solve the Problem

In order to solve the problem, the joint routing and scheduling method according to the present invention is a method that is executed in the control apparatus of the industrial automatic system, and includes an initial input step to receive an initial candidate route number (K) for network topology, specification of N traffic flows, and each traffic flow; a candidate route generation step to generate a set of valid routes including K candidate routes for each traffic flow using the specification of N traffic flows; a routing step to determine an optimized route of each traffic based on the remaining bandwidth of all links that belong to the set of valid routes of each traffic and all candidate routes; a scheduling step to determine the message transmission instant and Gate Control List of the switches on the routes for each traffic based on the optimized route of all N traffic flows and specification.

Effect of the Invention

As described above, the present invention ensures the real-time requirements of the time-critical traffic and has a network scalability.

on the route of a flow $f_i$ according to an embodiment of the present invention.

Figure 6:
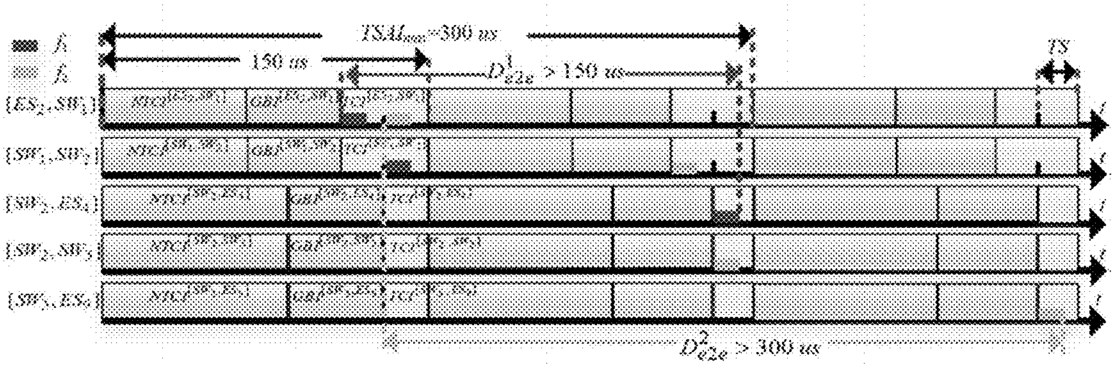
Figure 6:
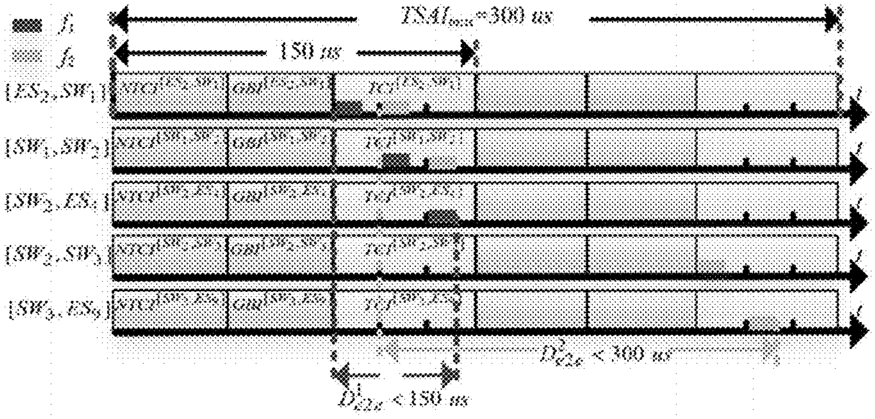

FIG. 6 is a drawing for explaining the process of determining the time slot number $$NTSTC_i^{opt}[k]$$

according to the present invention.

Figure 7:
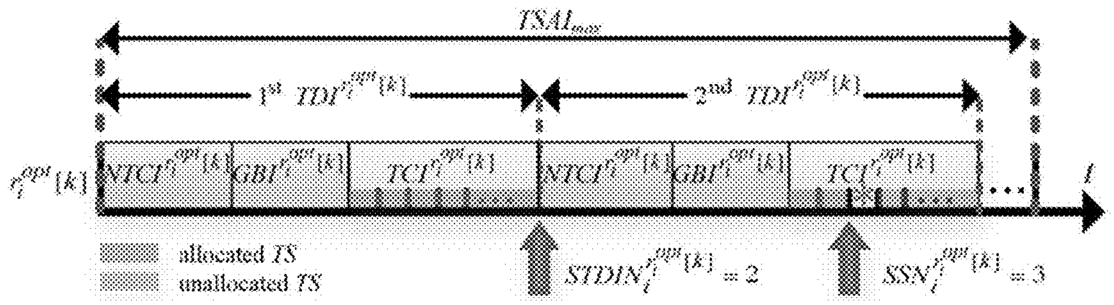

FIG. 7 is a drawing illustrating an example of using $$STDIN_i^{r_i^{opt}[k]}$$

and $$SSN_i^{r_i^{opt}[k]}$$

to determine the first TS allocated to flow $f_i$ in the egress port $$r_i^{opt}[k].$$

Figure 8:
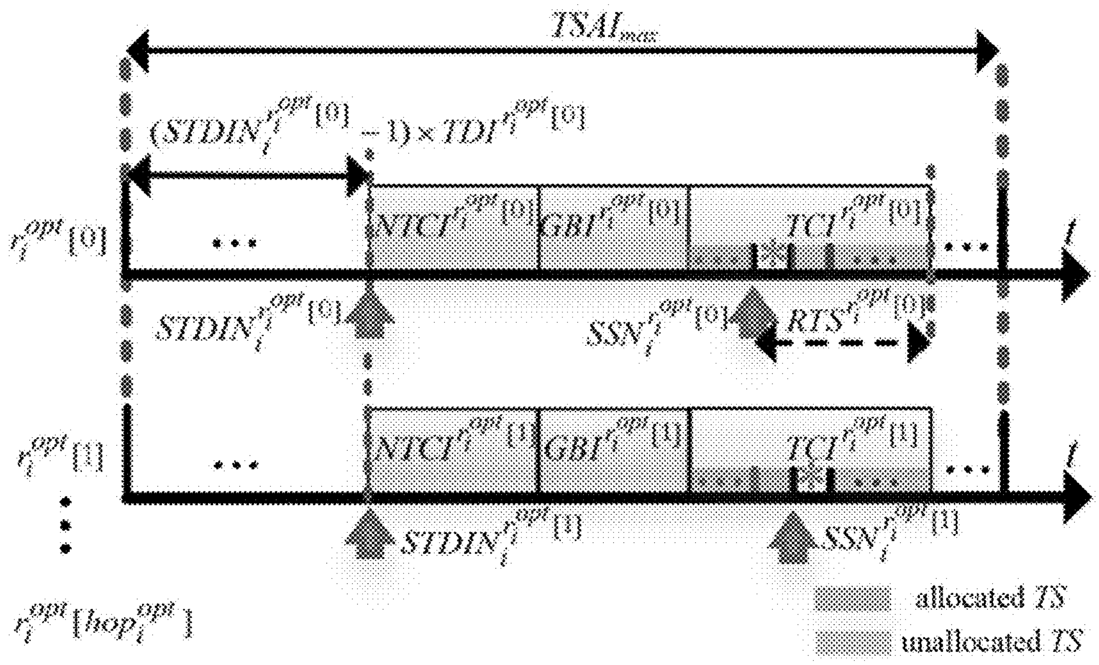

FIG. 8 is a drawing for explaining the process of allocating the first TS to flow $f_i$ in each egress port $$\left(r_i^{opt}[k],\ k = 0, \ldots, \mathrm{hop}_i^{opt}\right)$$

during the $TSAI_{max}$.

Figure 9:
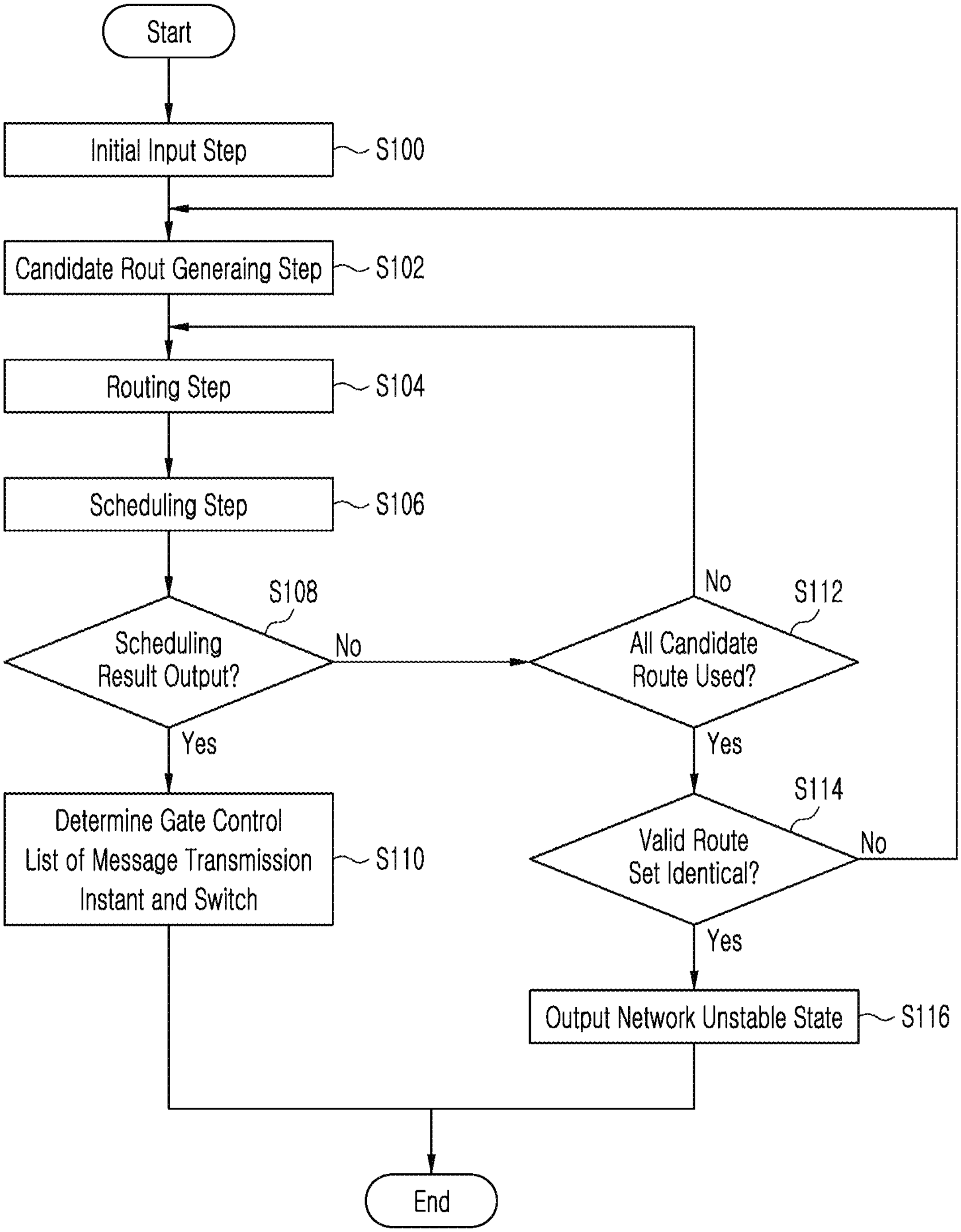

FIG. 9 is a flowchart illustrating the joint routing and scheduling method according to the present invention.

Figure 10:
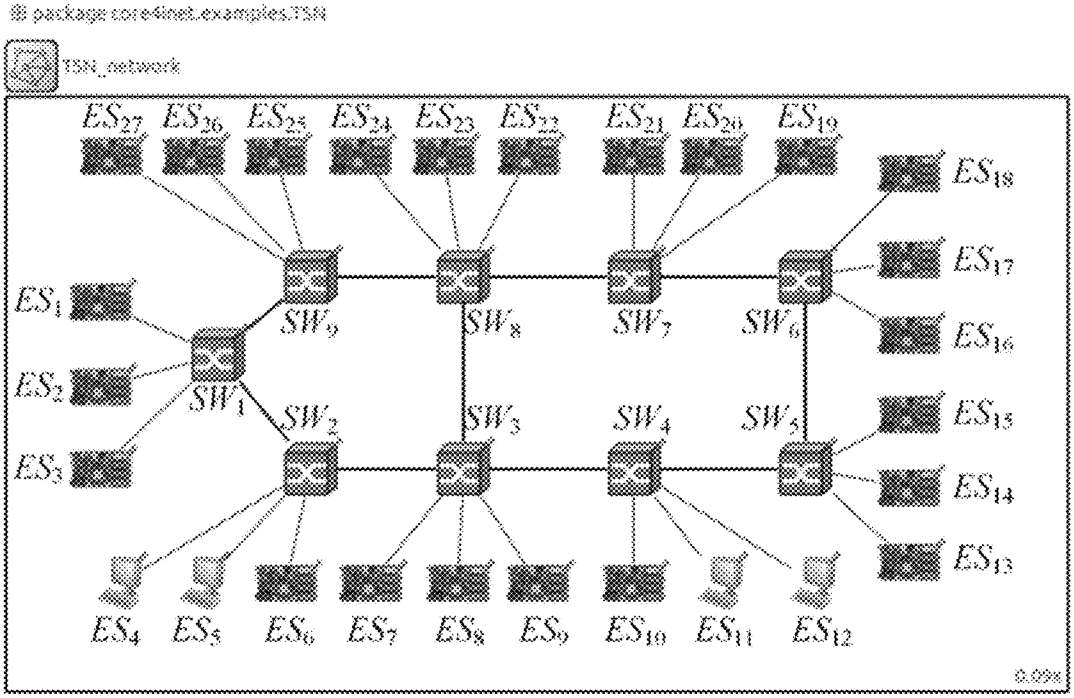

FIG. 10 is a screenshot illustrating TSN network in a test scenario.

Figure 11:
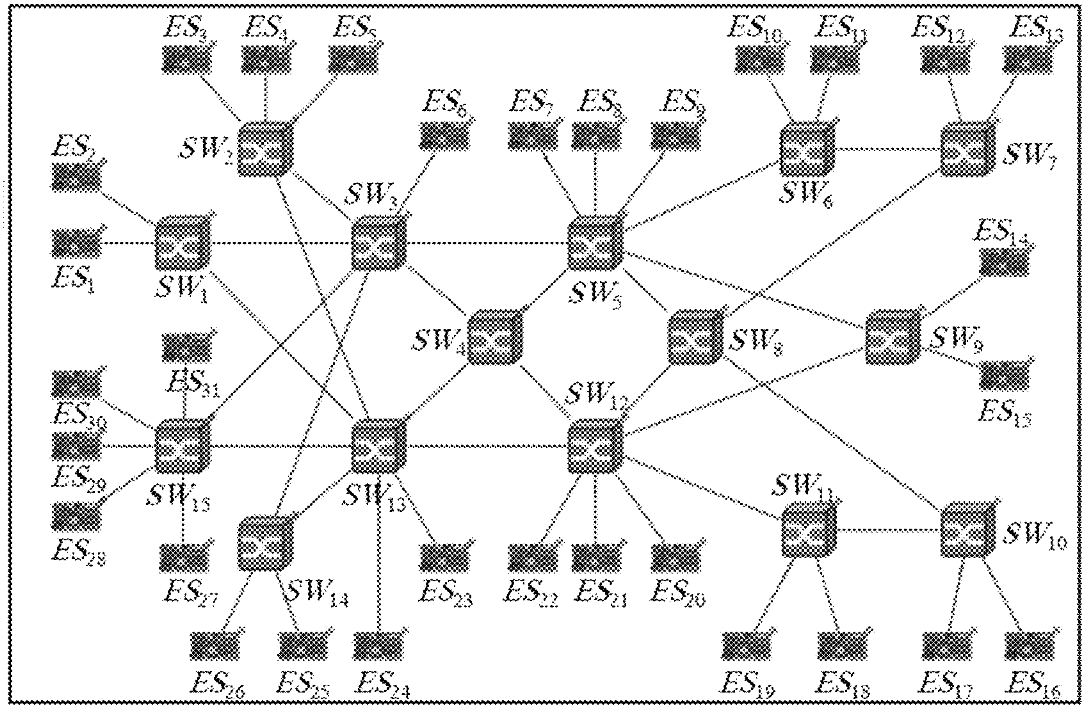

FIG. 11 is a drawing illustrating Orion CEV network with fifteen switches and thirty-one end stations.

DETAILED DESCRIPTION TO EXECUTE THE INVENTION

Hereinbelow, embodiments of the present invention will be described in detail while referring to the accompanying drawings. The configuration and effects of action of the present invention will be understood clearly through the detailed description below.

Prior to the detailed description, it should be noted that the same components will be denoted by the same reference numerals as much as possible even when presented in different drawings, and the specific description will be omitted when determined that the gist of the present invention may be blurred with respect to a well-known configuration.

The present invention proposes a new joint traffic routing and scheduling method in order to compute the routes and construct the schedule for the time-critical flow.

Multiple time-critical frames can be transmitted within the same protected window. Accordingly, the number of entries in the gate control list (GCL) can be constrained not to exceed the maximum value, i.e., 1024 entries. The computed GCLs are succinct, ensuring that the calculated GCLs can be easily implemented in real-world TSN devices.

The validity of the method of the present invention is verified through simulation experiments. The simulation results indicate that the real-time requirements of time-critical traffic can be guaranteed by using the method of the present invention, even if time-critical traffic and non-time-critical traffic coexist within one network.

The scalability of the method of the present invention in terms of the number of flows and the network size is evaluated. The experiments indicates that the computational times for up to 4000 flows in the realistic industrial network topology (with fifteen switches and thirty-one end stations) are at the sub-second level. In addition, the computational times for 4000 flows in the random networks with up to twenty-one switches and one hundred and five end stations are also at the sub-second level, which indicate the perfect scalability of the method of the present invention.

Compared with the well-known ILP-based approach, degree of conflict (DoC)-aware iterative routing and scheduling (DA/IRS) approach and hybrid genetic algorithm (HGA)-based approach, the method of the present invention is significantly faster in terms of the computational time, requiring only 2.83%, 0.13% and 0.069% of the computational time of the three approaches, respectively.

Architecture Model

The architecture model is a representation of an actual TSN network, which includes end stations (TSN and non-TSN end stations) denoted by ES, TSN switches denoted by SW, and full-duplex physical links. Each TSN switch may connect some TSN and non-TSN end stations. The clocks of all TSN switches and TSN end stations are assumed to be sufficiently synchronized according to IEEE 802.1AS-rev. Both TSN switches and TSN end stations support the scheduled transmission of frames according to the 802.1Qbv standard.

Figure 1:
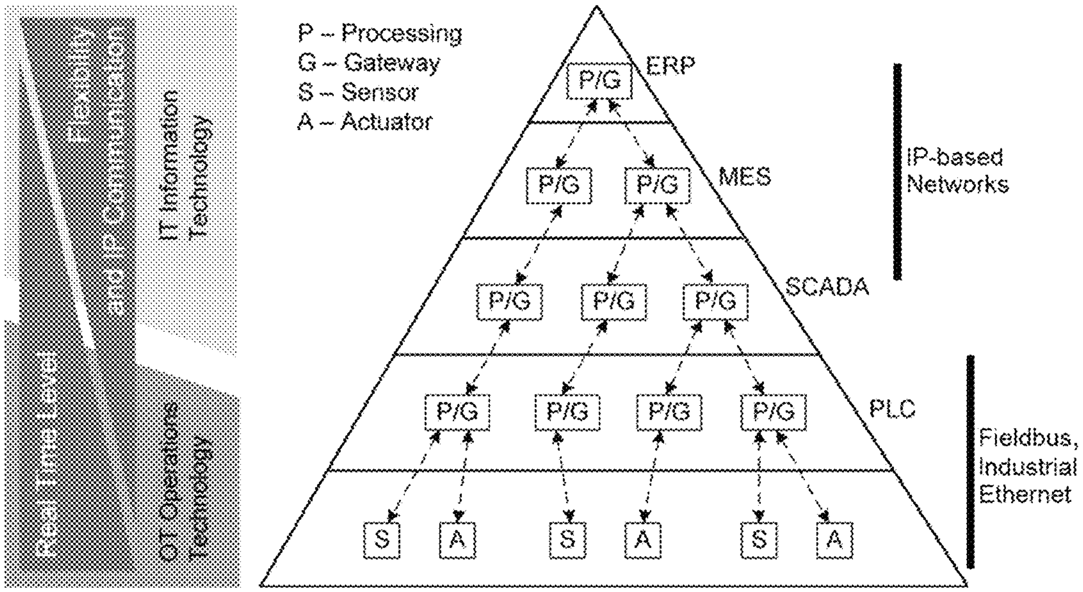
FIG. 1 is a drawing illustrating a hierarchical architecture of a general industrial automation system.
Figure 2:
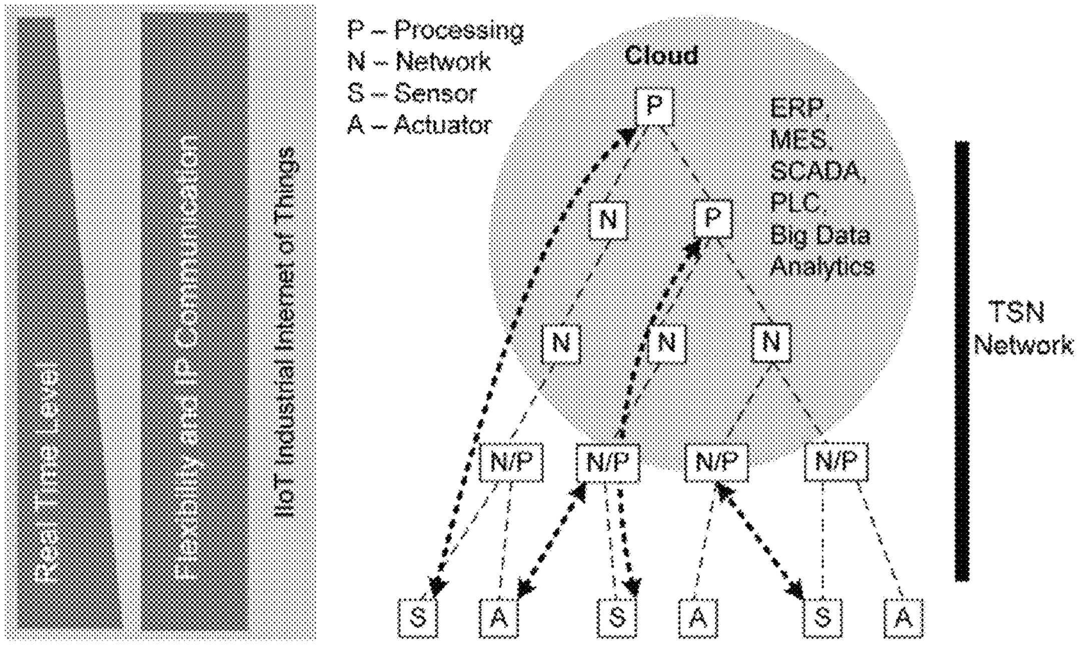
FIG. 2 is a drawing illustrating a hierarchical architecture of an industrial automation system applied with TSN network.
Figure 3:
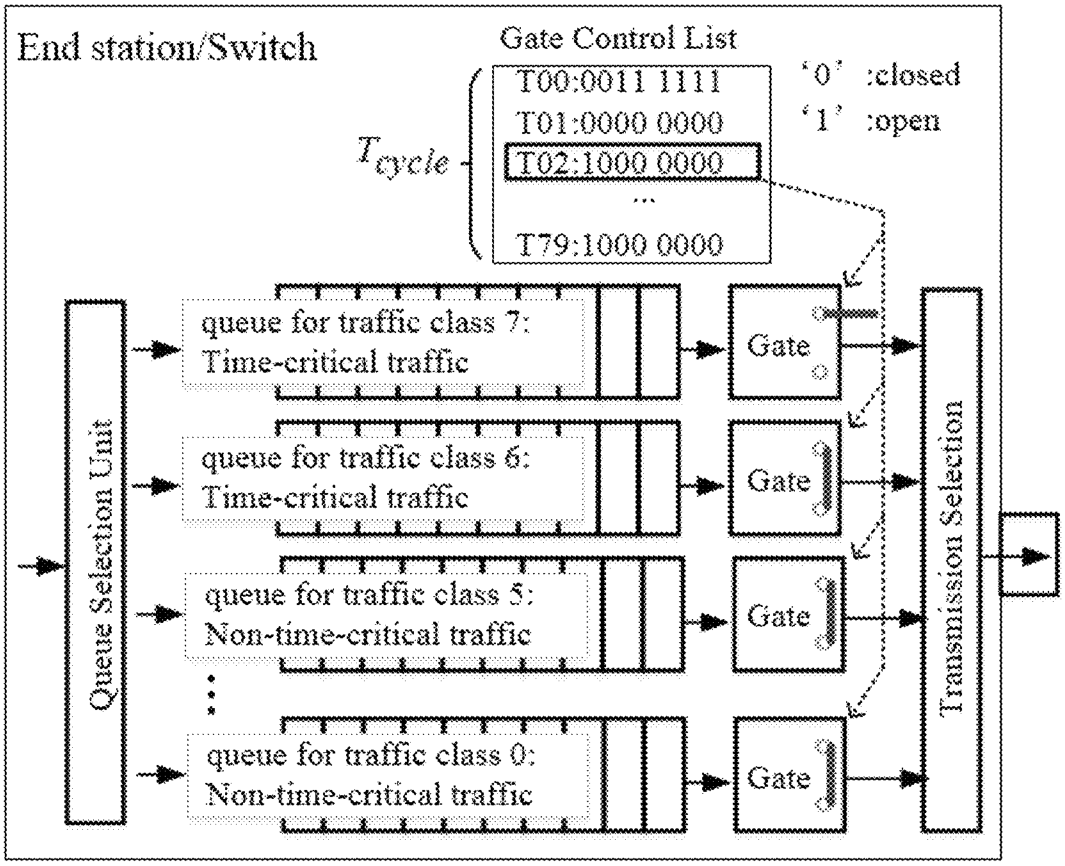
FIG. 3 is a drawing illustrating a configuration of an egress port of a TSN end station/switch.

Each egress port of the TSN end stations and TSN switches deploys a time-aware shaper and has eight queues, as illustrated in FIG. 3. Among these, two queues corresponding to IEEE 802.1Q traffic classes 7 and 6 are specialized for managing time-critical traffic, while the remaining six queues are used to manage non-time-critical traffic.

Each queue is equipped with a timed gate. When the gate of a queue is open, the frames inside the queue can be transmitted. Otherwise, the frames must wait in the queue before being transmitted until the gate becomes open. Therefore, the transmission of frames can be scheduled or controlled by managing the gate states, i.e., "closed" or "open". Specifically, the gate states change according to the entries in a GCL. Each entry in the GCL represents a gate operation and consists of a "GateOperationName" value, a "GateStates" value that determines the states of the eight gates, and a "TimeInterval" value that decides how long this operation will be sustained. The operations in the GCL repeat periodically, and the repetition period is denoted as $T_{cycle}$. A TSN network is a converged network in which time-critical and non-time-critical traffic may coexist.

In order to avoid the transmission of non-time-critical traffic interfering with the transmission of time-critical traffic, it is necessary to place a guard band between them. According to the 802.1Qbv standard, the length of the guard band can be set as long as the transmission time of a maximum transmission unit (MTU)-sized frame. Or, when the length of the non-time-critical traffic frames is known to the switches in advance, the length of the guard band can be set as long as the transmission time of the maximum non-time-critical traffic frame. In the embodiments of the present invention, the length of the guard band is set as long as the transmission time of an MTU-sized frame.

The network topology is modeled as a directed graph, $G \equiv (V, E)$ where $V = ES \cup SW$ represents the set of devices, i.e., end stations and switches, and $E \subseteq V \times V$ represents the set of directional physical links that connect two different devices.

Figure 4:
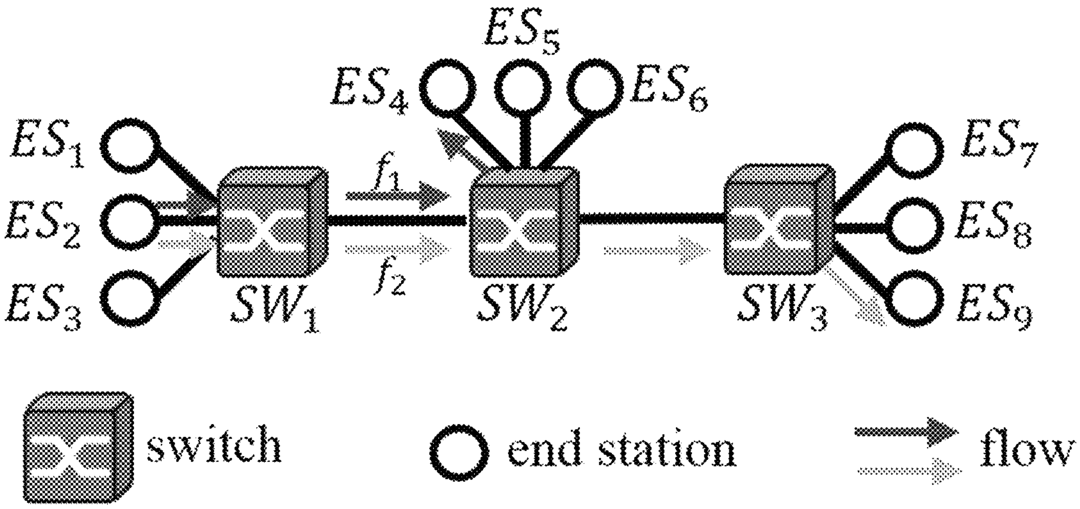
FIG. 4 is a drawing illustrating a TSN topology according to an embodiment of the present invention.

FIG. 4 illustrates an example of a TSN network topology with $ES = \{ES_i | i = 1, \ldots, 9\}$ and $SW = \{SW_j | j = 1, \ldots, 3\}$.

Referring to FIG. 4, the two flows $(f_1, f_2)$ each having different path are sent from $ES_2$ to $ES_4$ and $ES_9$, respectively.

Each full-duplex physical link between two devices $v_a$ and $v_b$ ($v_a \in V$, $v_b \in V$) is considered as two separate directional links denoted by ordered pairs $[v_a, v_b]$ and $[v_b, v_a]$, where the first element defines the sender device (talker) and the second element defines the receiver device (listener). For example, the physical link between $ES_2$ and $SW_1$ is considered two separate directional links denoted by $[ES_2, SW_1]$ and $[SW_1, ES_2]$.

Application Model

A set of time-critical and non-time-critical applications is considered to run within a TSN network. Time-critical applications are represented by time-critical traffic flows (e.g., periodic sensor monitoring messages), and non-time-critical applications are represented by non-time-critical traffic flows (e.g., sporadic office applications messages).

A flow is a multicast message transmission from one talker (the source end station) to one or multiple listeners (the destination end stations). It is noted that multicast flows can be considered to be a set of unicast flows. Without loss of generality, the number of listeners is reduced to one (unicast) to simplify the formalism, and extending the model to the general scenario is a simple step.

A flow $f_i$ is characterized by the tuple $$\left(src_i, dst_i, pd_i, sz_i, \varphi_i, \text{hop}_i^j, R_i^j\right),$$

where (1) $src_i \in ES$ represents the source end station, (2) $dst_i \in ES$ represents the destination end station, (3) $pd_i$ represents the period of the messages, (4) $sz_i$ represents the message size, (5) $\varphi_i$ represents the requirement of the maximum allowable end-to-end (e2e) delay, $$\text{hop}_i^j \tag{6}$$

represents the hop number of its $j^{th}$ route (out of K candidate routes of the flow $f_i$), and $$R_i^j = \left\{r_i^j[k] \in E \middle| k = 0, \ldots, \text{hop}_i^j\right\} \tag{7}$$

represents the $j^{th}$ route of the flow $f_i$.

$$R_i^j$$

is a set consisting of all physical links $$\left(r_i^j[k]\right)$$

on the propagation route, where k is the sequence of the link on the route.

For example, $$r_i^j[0]$$

indicates the physical link between the source end station transmitting the flow and the ingress port of the first hop switch receiving the flow. Since any egress port is connected to at most one link, an equivalence is established between an egress port and its associated link, e.g., $$r_i^j[0]$$

also indicates the egress port of the source end station. Each periodic message must be delivered before the next periodic message is transmitted; thus, it has a maximum allowable e2e delay requirement.

In order to facilitate the understanding of the notation of the tuple, the description of the flow $f_2$ in FIG. 4 is taken as an example. The source end station $src_2$ is $ES_2$, the destination end station $dst_2$ is $ES_9$. The period $pd_2$ is set as 300 us (the period's value depends on the application), the message size $sz_2$ is set as MTU-size, and the requirement of the maximum allowable e2e delay $\varphi_2$ is 300 us. There exists only one $$\left(\text{i.e., } R_2^1\right)$$

for $f_2$, the hop number $$\text{hop}_2^1$$

of the route $$R_2^1$$

is 3, and the route $$R_2^1$$

is $\{[ES_2, SW_1], [SW_1, SW_2], [SW_2, SW_3], [SW_3, ES_9]\}$ or expressed as $ES_2 \rightarrow SW_1 \rightarrow SW_2 \rightarrow SW_3 \rightarrow ES_9$.

The non-time-critical traffic flows are sporadic and do not have any e2e delay requirement. Thus, the parameters of $pd_i$ and $\varphi_i$ do not exist for non-time-critical traffic flows. The method of the present invention primarily schedules time-critical traffic flows, and the remaining bandwidth resources are allocated to non-time-critical traffic flows. In the following description, traffic flows indicate time-critical traffic flows in case no specific description is provided.

The actual e2e delay $$\left(D_{e2e}^i\right)$$

of a message of flow $f_i$ is the difference between the time at which the message is received by the listener and the time at which the corresponding talker begins to transmit the message. In order to satisfy the requirement of a time-critical application, the $$D_{e2e}^i$$

of each time-critical message must be smaller than or equal to the predetermined maximum allowable e2e delay ($\varphi_i$). The composition of the actual e2e delay is introduced along the data propagation route. A message is assumed to contain only one frame.

MTU-sized frames are considered throughout the invention, and the frame length is $L_{mtu}$. The time required to transmit all bits of a message into a physical link is denoted as the transmission delay $d_{trans}$. As a result, the propagation delay of this message in a physical link is denoted as $d_{prop}$. When the message arrives at a switch, it experiences a processing delay, denoted as $d_{proc}$. The $d_{proc}$ and $d_{prop}$ are assumed to be the same for all TSN switches and physical links. This assumption can be relaxed easily by defining individual processing and propagation delays according to the properties of TSN switches and links. The time required for a message to be transmitted from its talker to its listener without interruption (or queueing) is denoted as $$D^i_{phy}.$$

$$D^i_{phy} = \sum_{k=1}^{M_i+1} d_{trans} + \sum_{k=1}^{M_i+1} d_{drop} + \sum_{k=1}^{M_i} d_{proc}, \quad \text{[Equation 1]}$$

where $M_i$ denotes the number of switches on the propagation route between the talker and listener of a flow $f_i$.

Problem Statement

When a time-critical message has to wait in the queue of an egress port of the switch $SW_k$, this causes a nondeterministic queuing delay $$(d^i_{q\_SW_k}),$$

and the overall e2e delay $$D^i_{e2e}$$

of this message can be expressed as Eq. 2 as indicated below.

$$D^i_{e2e} = D^i_{phy} + \sum_{k=1}^{M_i} d^i_{q\_SW_k}. \quad \text{[Equation 2]}$$

When the $$D^i_{e2e}$$

of the message exceeds $\varphi_i$, the requirement of time-critical industrial application cannot be satisfied.

The present invention proposes a novel method to compute the routes for time-critical flows, eliminate the nondeterministic queuing delay (or interruption) for time-critical flows caused by unexpected transmission conflicts, and construct the schedules such that the coexistence of time-critical and non-time-critical flows are enabled and the e2e delay requirements of all time-critical flows can be satisfied simultaneously.

The method of the present invention can also compute the routes for non-time-critical flows. However, since the method of the present invention focuses on determining the routing and scheduling for time-critical flows, the routes for non-time-critical flows may be computed using the shortest path algorithm. The details of the joint routing and scheduling method are described hereinbelow.

Joint Routing and Scheduling Method

The method according to the present invention includes the inputs and outputs as indicated in Table 1.

TABLE 1

| | |
|---|---|
| Inputs | The network topology G.<br>Flow specifications of N time-critical traffic flows:<br>source end station $src_i$;<br>destination end station $dst_i$;<br>period $pd_i$;<br>maximum allowable e2e delay $\varphi_i$;<br>message size $sz_i$, which equals $L_{mtu}$.<br>The number of candidate routes K, which will be initially computed for each time-critical traffic flow. |
| Outputs | Routes for time-critical traffic flows.<br>The schedule results:<br>transmission instant $FMTI_i^{talker}$ of the first message of each time-critical traffic flow from the corresponding TSN talker;<br>GCLs for TSN switches. |

1) Entire Process of the Joint Routing and Scheduling Method

Inputs: Network topology (G), specifications of N flows, number of candidate routes (K) to be initially computed for each flow 01. Initialize the valid route set ($VR_i$) and the old valid route set (oldV $R_i$) to empty set for each flow $f_i$, i=1, . . . , N
02. Based on the ascending order of $\varphi_i$, examine the feasibility of the K routes of the corresponding flow $f_i$ orderly, wherein, compare $$D^i_{phy}$$

of each new route with $\varphi_i$; do not include the route that $$D^i_{phy} > \varphi_i$$

03. Using the optimal routing method to be described later, compute the function values of $|VR_i|$ for the flow with the smallest $\varphi_i$, and select the route with largest function value as its optimal route
04. Select the optimal route for the remaining flows orderly based on the ascending order of $\varphi_i$
05. Compute the schedule results by applying the optimal routes and specifications of all flows to the scheduling method as inputs
06. When failed to obtain the schedule result
07. When all valid routes in the V $R_i$ of the flow have not been attempted
08. Select the next suboptimal route in the V $R_i$ of the flow with the smallest $\varphi_i$ as its optimal route
09. Go back to lin 04
10. Else, when all valid routes in the V $R_i$ of the flow have been attempted
11. When $R_i$ and oldV $R_i$ (i=1, . . . , N) are not equal
12. Increase the value of K with an increment of 1

13. Store the value of $VR_i$ to oldV $R_i$
14. Go back to line 02
15. Else, when V $R_i$ and oldV $R_i$ (i=1, . . . , N) are equal
16. This indicates that there are no more valid routes even when the value of K is increased, the network system reaches an unstable condition, the input traffic exceeds the network's bandwidth capacity, and the number of flows needs to be reduced and end
17. Else, when the schedule results are obtained
18. Optimal routes for flows and the schedule results are outputted Output: Routes for flows and the schedule results First, initialize the valid route set (V $R_i$) and the old valid route set (oldV $R_i$) to empty set for each flow $f_i$, i=1, . . . , N (line 01).

Subsequently, based on the given network topology (G) and the flow specifications of N time-critical traffic flows, the first K candidate routes $$(R_i^j, j = 1, \ldots, K)$$

for each flow $f_i$ are computed in sequence according to the ascending order of their maximum allowable e2e delay $\varphi_i$ (line 02).

Various algorithms may be used to compute the first K routes. For example, there are Yen's K shortest paths algorithm, Feng's node classification algorithm, Kurtz's sidetrack-based algorithm, and Zoobi's sidetrack-based variant algorithm. In the present invention, Zoobi's sidetrack-based variant algorithm is adopted, which is currently the fastest solution to compute K shortest simple paths. During the process of computing the first K routes for $f_i$, every time after obtaining the next new route, the hop number of this new route can be obtained. Using the Eq. 1, $$D_{phy}^i$$

which is the time required to transmit a message of $f_i$ from its talker to its listener without interruption (or queuing) on the route, is computed and then compared with the message's $\varphi_i$. When $$D_{phy}^i$$

is larger than $\varphi_i$, this new route will be considered an invalid route and will not be included in the valid route set (V $R_i$) for $f_i$. The number of valid routes in V $R_i$ is denoted as |V $R_i$|.

After obtaining the valid route set for the flow with the smallest di, the function values of |V $R_i$| routes of the flow are computed using the optimal routing method to be described later. The route with the largest function value among the |V $R_i$| routes is selected as the optimal route (line 03).

Subsequently, using the optimal routing method, the optimal routes for the remaining flows are selected in sequence based on the ascending order of their $\varphi_i$ values (line 04).

The optimal routes and flow specifications of N time-critical traffic flows are used as inputs to the scheduling method to be described later to compute the schedule results (line 05).

When obtaining the schedule results fails, the next sub-optimal route of the flow with the smallest $\varphi_i$ is selected as its optimal route; subsequently, the optimal routes for the remaining flows are recomputed, and the scheduling method is reused to compute the schedule results. The process is repeated until the schedule results are computed successfully or all valid routes in the valid route set V $R_i$ for the flow with the smallest $\varphi_i$ have been attempted (lines 06-09).

After all valid routes in the $VR_i$ for the flow with the smallest $\varphi_i$ have been attempted and obtaining the schedule results still fails, compare the valid route set ($VR_i$) and old valid route set (oldV $R_i$, which is empty set initially) of each flow $f_i$. When the V $R_i$ and the oldV $R_i$ are not equal, this indicates additional valid routes might be obtained in the next repeated run; thus, the value of K is increased with an increment of 1, store the current value of the V $R_i$ to the oldV $R_i$, and the entire routing and scheduling process is repeated (i.e., go back to line 02) until the schedule results are computed successfully or the newly obtained V $R_i$ is equal to the oldV $R_i$ for each flow $f_i$ when comparing them (lines 10-14). When the V $R_i$ is equal to the oldV $R_i$ for each flow $f_i$, this indicates even when the value of K is increased, there are no additional valid routes obtained, the network system reaches an unstable condition, the input traffic exceeds the network's bandwidth capacity, and the number of flows in the network must be reduced (lines 15-16). On the other hand, when the schedule results are computed successfully, the routes for flows and the schedule results are outputted (lines 17-18).

2) Optimal Routng Method

Inputs: The $VR_i$ of a flow $f_i$, the residual bandwidth of all links in the network
01. For route $R_i^j$, $R_i^j \in$ V $R_i$
02. Compute $R_i^j.D_{phy}^i$ using the Eq. 1
03. Compute $R_i^j.B$ using the Eq. 3
04. End
05. Compute $(R_i^j.D_{phy}^i)_{min}$ and $(R_i^j.B)_{max}$ for all routes
06. For route $R_i^j$, $R_i^j \in$ V $R_i$
07. Compute $R_i^j.func(R_i^j.D_{phy}^i, R_i^j.B)$ using Eq. 4
08. End
09. Select the route with the largest function value as the optimal route ($R_i^{opt}$)
10. Update the residual bandwidth of links on the optimal route Outputs: $R_i^{opt}$ for flow $f_i$ The goal of the optimal routing method is to choose the optimal routes of the flows that reduce the chances of exceeding the maximum allowable e2e delay and avoid some links with a higher degree of congestion in terms of bandwidth. In order to determine the optimal route for a flow $f_i$, the $$R_i^j \cdot D_{phy}^i$$

and $$R_i^j \cdot B$$

of route $$R_i^j$$

are selected as the metrics by referencing the metric selection criterion.

The $$R_i^j \cdot D_{phy}^i$$

of route $$R_i^j$$

of flow $f_i$ is the time required to transmit a message of $f_i$ from its talker to its listener without interruption (or queuing) on route $$R_i^j,$$

which is calculated using Eq. (1). The residual bandwidth $$\left(R_i^j \cdot B\right)$$

of route $$R_i^j$$

is the minimum residual bandwidth among all links on the route:

$$R_i^j.B = \text{Min}_{k=0}^{hop_i^j} r_i^j[k].b \quad \text{[Equation 3]}$$

where $$r_i^j[k] \cdot b$$

is the residual bandwidth of a link $$r_i^j[k],\ k = 0, \ldots, \text{hop}_i^j$$

on route $$R_i^j$$

of flow $f_i$. Based on the metrics $$R_i^j \cdot D_{phy}^i$$

and $$R_i^j \cdot B,$$

define a function $$func\left(R_i^j \cdot D_{phy}^i, R_i^j \cdot B\right)$$

for route $$R_i^j:$$

$$R_i^j.func\left(R_i^j.D_{phy}^i, R_i^j, B\right) = \omega_1 \cdot \left(\frac{\left(R_i^j.D_{phy}^i\right)_{min}}{R_i^j.D_{phy}^i}\right) + \omega_2 \cdot \left(\frac{R_i^j.B}{\left(R_i^j.B\right)_{max}}\right), \quad \text{[Equation 4]}$$

where $$\sum_{m=1}^{2} \omega_m = 1,$$

for which both $\omega_1$ and $\omega_2$ have a value between 0 and 1 based on the weighting preference of the system designer;

$$\left(R_i^j \cdot D_{phy}^i\right)_{min}$$

is the minimum $$R_i^j \cdot D_{phy}^i$$

among all routes; and $$\left(R_i^j \cdot B\right)_{max}$$

is the maximum $$R_i^j \cdot B$$

among all routes.

For all routes in the valid route set (V $R_i$) of flow $f_i$, $$R_i^j \cdot D_{phy}^i$$

and $$R_i^j \cdot B$$

are computed (lines 01-04).

Subsequently, $$\left(R_i^j \cdot D_{phy}^i\right)_{min}$$

and $$\left(R_i^j \cdot B\right)_{max}$$

are computed for all routes (line 05).

Subsequently, for all routes in the valid route set (V $R_i$), the function value $$R_i^j \cdot func\left(R_i^j \cdot D_{phy}^i, R_i^j \cdot B\right)$$

is computed (lines 06-08).

The route with the maximum function value is selected as the optimal route $$\left(R_i^{opt}\right)$$

(line 09).

Maximizing $$R_i^j \cdot func\left(R_i^j \cdot D_{phy}^i, R_i^j \cdot B\right)$$

means minimizing $$R_i^j \cdot D_{phy}^i$$

and maximizing $$R_i^j \cdot B.$$

Selecting a route with a smaller $$R_i^j \cdot D_{phy}^i$$

can aid in satisfying $\varphi_i$, and selecting a route with a larger $$R_i^j \cdot B$$

can aid in spreading a flow across the entire network and choosing a route with a lower degree of congestion in terms of bandwidth.

Other metrics can also be included in Eq. 4 in the future. For example, the route cost in a deterministic networking (DetNet) network may be included. After determining the optimal route for a flow, the residual bandwidth of the links on its optimal route will be updated accordingly (line 10).

3) Scheduling Method

The scheduling method according to the present invention includes four steps. The basic concept of the scheduling method is to divide the bandwidth resource into time slots using time-division multiplexing. Then, assign each time-critical traffic frame to an appropriate time slot such that each flow does not experience nondeterministic queueing delay and satisfies the maximum allowable e2e delay requirement.

---

Inputs: Specifications and optimal routes for N flows

01. Step 1: Determine the length of time-division interval ($TDI^{r_i^{opt}[k]}$) and a time slot (TS) for the time-division multiplexing based on Eq. 8 and 9
02. Step 2: Determine the time slot allocation interval ($TSAI_i$) for each flow $f_i$ using Eq. 10
03. Determine the number of time slots ($NTSTC^{r_i^{opt}[k]}$) allocated in time-critical data interval $TCI^{r_i^{opt}[k]}$ using Eq. 12
04. Determine the length of $TCI^{r_i^{opt}[k]}$ and non-time-critical data interval $NTCI^{r_i^{opt}[k]}$ based on Eq. 13 and 14
05. Step 3: Allocate specific TSs to each flow $f_i$ and determine the transmission instant ($FMTI_i^{talker}$) of the first time-critical message of $f_i$ from its TSN talker
06. Specifically, firstly determine the allocation sequence $AS_{eq}[n](n = 0, \ldots, N - 1)$ -continued 07. Select a flow $f_i$ according to the $AS_{eq}[n]$
08. Begin from the first $TDI^{r_i^{opt}[0]}$ in egress port $r_i^{opt}[0]$
09. When $1 \leq RTS^{r_i^{opt}[0]} \leq NTSTC^{r_i^{opt}[0]}$
10. Determine the starting number of $TDI^{r_i^{opt}[0]}$ ($STDIN_i^{r_i^{opt}[0]}$) and the starting number of slot ($SSN_i^{r_i^{opt}[0]}$) on the egress port $r_i^{opt}[0]$ for $f_i$, go to line 13
11. Else
12. Move to the next $TDI^{r_i^{opt}[0]}$, go back to line 09
13. Determine the $STDIN_i^{r_i^{opt}[k]}$ and $SSN_i^{r_i^{opt}[k]}$, k = 1, ..., $hop_i^{opt}$
14. Determine the $FMTI_i^{talker}$ using Eq. 16
15. In port $r_i^{opt}[k]$($k = 0, \ldots, hop_i^{opt}$) , allocate other time slots to $f_i$repeatedly according to its $TSAI_i$
16. Repeat lines 07-15 until all flows are allocated with $FMTI_i^{talker}$ values
17. Step 4: Derives the GCLs for the TSN switches Outputs: $FMTI_i^{talker}$, GCLs for TSN switches <Step 1>

This step determines the length of the time-division interval $$\left(TDI^{r_i^{opt}[k]}\right)$$

and the length of a time slot (TS) for the time-division multiplexing.

When the messages of time-critical traffic flows pass through the egress ports on their propagation routes, the bandwidth resource of the egress ports are shared. In the present invention, the bandwidth of the egress port of an arbitrary TSN device (i.e., a TSN end station or TSN switch) is divided into time-division multiplexing intervals, which are called "time-division intervals". Herein, an egress port $$r_i^{opt}[k]$$

on the optimal route of an arbitrary flow $f_i$ is used as an example.

Figure 5:
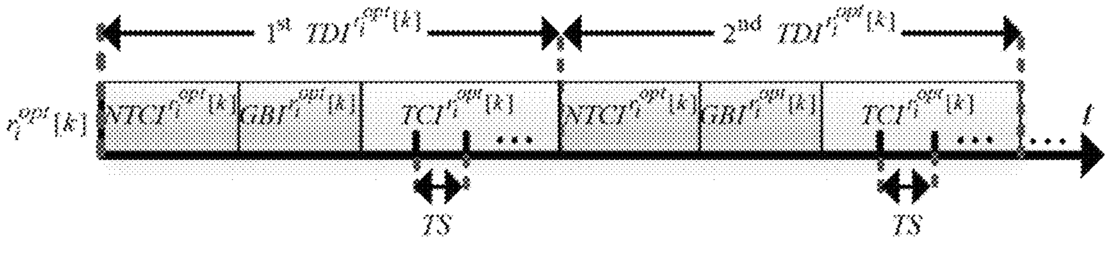
FIG. 5 is a drawing illustrating a bandwidth allocation of the egress port $$r_i^{opt}[k]$$

The bandwidth allocation of the egress port $$r_i^{opt}[k]$$

is illustrated in FIG. 5. Each time-division interval $$TDI^{r_i^{opt}[k]}$$

is subdivided into a non-time-critical data interval $$\left(NTCI^{r_i^{opt}[k]}\right),$$

a guard band interval $$\left(GBI^{r_i^{opt}[k]}\right)$$

and a time-critical data interval $$\left(TCI^{r_i^{opt}[k]}\right).$$

$$NTCI^{r_i^{opt}[k]}$$

is used by non-time-critical data, i.e., non-time-critical data will be transmitted during this time interval.

$$GBI^{r_i^{opt}[k]}$$

is used to isolate $$NTCI^{r_i^{opt}[k]}$$

and $$TCI^{r_i^{opt}[k]}$$

to avoid the transmission of non-time-critical traffic interfering with the transmission of time-critical traffic.

$$TCI^{r_i^{opt}[k]}$$

is further subdivided into multiple TSs, and different TSs will be used to transmit different time-critical data.

As indicated in Eq. 5, the base period ($pd_{base}$) is defined as the smallest value among the periods ($pd_i$) of N time-critical traffic flows.

$$pd_{base} = \min\{pd_i, \forall\, i = 1, \ldots, N\}, \quad \text{[Equation 5]}$$

In order to restrict the length of the hyperperiod, which is the least common multiple of all periods, we adopt harmonic periods. For flows violating this condition, the periods ($pd_i$) of flows have been reduced and adjusted, as indicated in Eq. 6, such that the periods will become harmonic.

$$pd_i = \alpha_i \times pd_{base},\ \alpha_i = 2^{\lfloor \log_2(pd_i/pd_{base}) \rfloor} \quad \text{[Equation 6]}$$

The first term in Eq. 6 indicates that $pd_i$ is adjusted by multiplying an integer $\alpha_i$ by the base period $pd_{base}$, wherein $\alpha_i$ is the ratio (with respect to $pd_{base}$) and is defined as a power of two, i.e., $2^m$, and m is determined by the floor function $m(x)=\lfloor x \rfloor$.

$$TDI'^{opt}_i[k]$$

is the basic scheduling unit. In the meantime, $$TDI'^{opt}_i[k]$$

is expected to be as large as possible to contain more time slots for time-critical data. On the other hand, in order to aid in satisfying the maximum allowable e2e delay of time-critical traffic flows, the length of $$TDI'^{opt}_i[k]$$

should be set not to exceed the smallest period value ($pd_{base}$), as indicated in Eq. 7.

$$TDI'^{opt}_i[k] \leq pd_{base}, \quad \text{[Equation 7]}$$

$TDI'^{opt}_i[k]$ is then determined as in *Eq.* 8.

$$TDI'^{opt}_i[k] = pd_{base}. \quad \text{[Equation 8]}$$

Next, the length $$GBI'^{opt}_i[k]$$

is determined as $$GBI'^{opt}_i[k] = L_{mtu}/NL_{spd},$$

where $NL_{spd}$ is the network link speed. Regarding the length of a TS, the TS should be sufficiently long for complete transmission of a time-critical frame (which results in a transmission delay, $d_{trans}$). In addition, after a time-critical frame is transmitted, this frame will experience a propagation delay ($d_{prop}$) on the following link and a processing delay ($d_{proc}$) inside the next-hop switch, this frame can be transmitted from the next-hop switch during the next TS designed for it. Thus, the length of a TS is determined as follows.

$$TS = d_{trans} + d_{prop} + d_{proc} \quad \text{[Equation 9]}$$

<Step 2>

This step determines the time slot allocation interval ($TSAI_i$) for a time-critical traffic flow $f_i$ and the number of time slots $$\left(NTSTC'^{opt}_i[k]\right)$$

allocated in the time-critical data interval $$TCI'^{opt}_i[k].$$

The TSs in $$TCI'^{opt}_i[k].$$

should be appropriately allocated to time-critical traffic flows to avoid transmission collision between messages of different flows and concomitant nondeterministic queuing delays in the switches. In order to achieve this, first, the $TSAI_i$ must be determined for each flow. During each period of $f_i$, a new message is transmitted. Thus, the $TSAI_i$ values are determined using Eq. 10.

$$TSAI_i = pd_i \quad \text{[Equation 10]}$$

Based on the definition of TSAI; in Eq. 10, the maximum time slot allocation interval ($TSAI_{max}$), as denoted in Eq. 11, is the least common multiple of the $TSAI_i$s of N time-critical traffic flows. The scheduling is repeated at an interval of $TSAI_{max}$.

$$TSAI_i = \max\{TSAI_i, \forall\ i = 1, \ldots, N\} \quad \text{[Equation 11]}$$

As discussed, when some flows pass through the same egress port, they share the bandwidth resource of the egress port. An egress port is defined as a shared egress port when a flow or some flows pass through the egress port. Because the routes $$(R^{opt}_i)$$

of all time-critical traffic flows have been determined, the number of shared egress ports in the entire network and the number of flows that share the bandwidth resource of each shared egress port can be obtained.

The set of the shared egress ports in the entire network is denoted as SEP, and the number of the shared egress ports in the entire network is denoted as |SEP|. For the $l^{th}$ ($l$=1, . . . , |SEP|) shared egress port in the network, a flow set that contains some flows passing through this port is denoted as $F_l$, and the number of flows in the set $F_l$ is denoted as $|F_l|$.

For example, as illustrated in FIG. 4, there are two flows ($f_1$ and $f_2$) in the network, which are sent by $ES_2$ to $ES_4$ and $ES_9$, respectively. The route of $f_1$ is $ES_2 \rightarrow SW_1 \rightarrow SW_2 \rightarrow ES_4$, and the route of $f_2$ is $ES_2 \rightarrow SW_1 \rightarrow SW_2 \rightarrow SW_3 \rightarrow ES_9$. Since any egress port is connected to at most one link, an equivalence is established between an egress port and its associated link. Based on the routes of the two flows, in the set SEP, there are five shared egress ports, i.e., the $1^{st}$ shared egress port [$ES_2$, $SW_1$], $2^{nd}$ port [$SW_1$, $SW_2$], $3^{rd}$ port [$SW_2$, $ES_4$], $4^{th}$ port [$SW_2$, $SW_3$], and $5^{th}$ port [$SW_3$, $ES_9$]. There are five corresponding flow sets: flow set $F_1=\{f_1, f_2\}$, flow set $F_2=\{f_1, f_2\}$, flow set $F_3=\{f_1\}$, flow set $F_4=\{f_2\}$, and flow set $F_5=\{f_2\}$.

Next, the ratio of the time slot allocation interval ($TSAI_i$) divided by the time-division interval $$\left(TDI^{r_i^{opt}[k]}\right)$$

is denoted as $\beta_i$, i.e., $$\beta_i = TSAI_i / TDI^{r_i^{opt}[k]}.$$

$TSAI_i$ indicates how frequently a time slot will be allocated to flow $f_i$. The reciprocal of the ratio $$\beta_i\left(\text{i.e., } 1/\beta_i = TDI^{r_i^{opt}[k]} / TSAI_i\right)$$

indicates the number of time slots required for allocating to flow $f_i$ in a single $$TDI^{r_i^{opt}[k]}.$$

It is assumed that the egress port $$r_i^{opt}[k]$$

is the $l^{th}$ ($l=1, \ldots, |SEP|$) shared egress port in the network. In order to accommodate all the flows (inside the set $F_l$) that pass through the egress port $$r_i^{opt}[k]$$

in the $$TCI^{r_i^{opt}[k]},$$

at least $\lceil \Sigma_{f_i \in F_l} (1/\beta_i) \rceil$ time slots should be contained inside the $$TCI^{r_i^{opt}[k]}$$

in a single $$TDI^{r_i^{opt}[k]}.$$

In addition, because it takes one TS for a message to be transmitted to the next-hop switch, the hop numbers of flows should be considered. The largest hop number among all the flows in the set $F_l$ is denoted as $$\max\left(hop_i^{opt}\right),$$

$f_i \in F_l$, and the flow ID of the flow with the largest hop number is denoted as $$\operatorname{argmax}\left(\max\left(hop_i^{opt}\right)\right).$$

Considering the flow $$f_{argmax\left(max\left(hop_i^{opt}\right)\right)}$$

in the set $F_l$ that has the largest hop number $$\max\left(hop_i^{opt}\right)$$

and flow ID $$\operatorname{argmax}\left(\max\left(hop_i^{opt}\right)\right),$$

the ratio of its time slot allocation interval $$\left(TSAI_{argmax\left(max\left(hop_i^{opt}\right)\right)}\right)$$

divided by the time-division interval is $$\beta_{argmax\left(max\left(hop_i^{opt}\right)\right)}.$$

The message of flow $$f_{argmax\left(max\left(hop_i^{opt}\right)\right)}$$

will be transmitted forward $$\max\left(\text{hop}_i^{opt}\right)$$

hops during its period or time slot allocation interval $$\left(TSAI_{argmax\left(max\left(hop_i^{opt}\right)\right)}\right).$$

This indicates that this message will experience $$\left(\max\left(\text{hop}_i^{opt}\right)/\beta_{argmax\left(max\left(hop_i^{opt}\right)\right)}\right)$$

hops on average during a single time-division interval. Thus, we need to further enlarge the number of time slots in the time-critical data interval by $$\left(\max\left(\text{hop}_i^{opt}\right)/\beta_{argmax\left(max\left(hop_i^{opt}\right)\right)}\right).$$

Finally, $$NTSTC^{r_i^{opt}}[k]$$

(it should be an integer) is determined as Eq. 12.

$$NTSTC^{r_i^{opt}}[k] = \left\lceil \max\left(\sum_{f_i \in F_l}\left(\frac{1}{\beta_i}\right) + \frac{\max\left(\text{hop}_i^{opt}\right)}{\beta_{argmax\left(max\left(hop_i^{opt}\right)\right)}}\right)\right\rceil, \quad l = 1, \ldots, |SEP|. \qquad \text{[Equation 12]}$$

Next, the process of determining $$NTSTC^{r_i^{opt}}[k]$$

is explained using a simple example. As illustrated in FIG. 4, $ES_2$ sends two flows ($f_1$ and $f_2$) to $ES_4$ and $ES_9$, respectively. The period and route of $f_1$ are 150 us and $ES_2 \rightarrow SW_1 \rightarrow SW_2 \rightarrow ES_4$ (the hop number is 2), respectively; and the period and route of $f_2$ are 300 us and $ES_2 \rightarrow SW_1 \rightarrow SW_2 \rightarrow SW_3 \rightarrow ES_9$ (the hop number is 3), respectively. The length of the time-division interval may be determined as 150 us. The time slot allocation intervals $TSAI_1$ and $TSAI_2$ are determined to be 150 us and 300 us, respectively. $TSAI_{max}$ is determined as 300 us.

As described above, there are five shared egress ports, i.e., ports [$ES_2$, $SW_1$], [$SW_1$, $SW_2$], [$SW_2$, $ES_4$], [$SW_2$, $SW_3$], and [$SW_3$, $ES_9$]. There are five flow sets, i.e., $F_1=\{f_1, f_2\}$, $F_2=\{f_1, f_2\}$, $F_3=\{f_1\}$, $F_4=\{f_2\}$, and $F_5=\{f_2\}$.

When the number of time slots in the time-critical data interval is determined by $\lceil \Sigma_{f_i \in F_l} (1/\beta_i) \rceil$, the number of time slots in the time-critical data interval of ports [$ES_2$, $SW_1$], [$SW_1$, $SW_2$], [$SW_2$, $ES_4$], [$SW_2$, $SW_3$], [$SW_3$, $ES_9$] is 2, 2, 1, 1, and 1, respectively.

It may be noted that the maximum allowable e2e delay requirements of $f_1$ and $f_2$ are not satisfied (as illustrated in FIG. 6(*a*)). However, when the number of time slots in the time-critical data interval is determined by Eq. 12, the number of time slots in the time-critical data interval of ports [$ES_2$, $SW_1$], [$SW_1$, $SW_2$], [$SW_2$, $ES_4$], [$SW_2$, $SW_3$], [$SW_3$, $ES_9$] will be 3, 3, 3, 3, and 3, respectively, and the maximum allowable e2e delay requirements of $f_1$ and $f_2$ will be satisfied (as illustrated in FIG. 6(*b*)).

Next, the length of $$TCI^{r_i^{opt}}[k]$$

is determined. The length of a TS is determined as $TS=d_{trans}+d_{prop}+d_{proc}$ in Step 1, and $$NTSTC^{r_i^{opt}}[k]$$

is determined using Eq. 12. Thus, the length of $$TCI^{r_i^{opt}}[k]$$

can be obtained according to Eq. 13.

$$TCI^{r_i^{opt}}[k] = NTSTC^{r_i^{opt}}[k] \times TS. \qquad \text{[Equation 13]}$$

The length of the guard band interval $$\left(GBI^{r_i^{opt}}[k]\right)$$

is determined as $$GBI^{r_i^{opt}}[k] = L_{mtu}/NL_{spd},$$

where $NL_{spd}$ is the network link speed, and the length of the non-time-critical interval $$NTCI^{r_i^{opt}}[k]$$

is determined as Eq. 14.

$$NTCI^{r_i^{opt}}[k] = TDI^{r_i^{opt}}[k] - GBI^{r_i^{opt}}[k] - TCI^{r_i^{opt}}[k] \qquad \text{[Equation 14]}$$

<Step 3>

This step allocates specific TSs to each time-critical traffic flow $f_i$, and determines the transmission instant $$\left(FMTI_i^{talker}\right)$$

of the first time-critical message of $f_i$ from its TSN talker. In this step, a time-critical flow with a smaller maximum allowable e2e delay will be preferentially allocated a time slot. When the maximum allowable e2e delays of two time-critical flows are the same, then the time-critical flow with a larger hop number ($hop_i^{opt}$) will be preferentially allocated a time slot. When the maximum allowable e2e delays and hop numbers of two time-critical flows are the same, a time slot can be preferentially allocated to any of the two time-critical flows. In the present invention, the time-critical flow with a smaller flow ID will be preferentially allocated a time slot.

Based on this rule, the allocation sequence $AS_{eq}[n]$ (n=0, . . . , N−1) is determined, which is an integer value that indicates the flow ID of $f_i$. For example, "$AS_{eq}[0]=1$" indicates that flow $f_1$ will be the first flow to be allocated a time slot, "$AS_{eq}[N-1]=5$" indicates that the flow $f_5$ will be the last flow to be allocated a time slot.

As mentioned in Step 2, the scheduling is repeated at an interval of $TSAI_{max}$. Therefore, in the following description, only the scheduling process (i.e., time slot allocation process) during the first $TSAI_{max}$ is described.

The available TS in $TSAI_{max}$ is allocated to each flow orderly according to the allocation sequence $AS_{eg}[n]$ (n=0, . . . , N−1). The principle of the allocation process is to allocate the time-critical message of $f_i$ to "the first available" TSs in the $TSAI_{max}$ according to the allocation sequence $AS_{eq}[n]$. The summary of the allocation process is as follows.

(1) for the egress ports of talker/switches $$\left(r_i^{opt}[k],\ k = 0, \ldots, \text{hop}_i^{opt}\right)$$

that will be passed through by $f_i$, the first TS allocated to flow $f_i$ is determined by selecting the first available TS in the $TSAI_{max}$.

(2) other time slots in egress ports $$\left(r_i^{opt}[k],\ k = 0, \ldots, \text{hop}_i^{opt}\right)$$

are allocated to $f_i$ repeatedly according to the time slot allocation interval $TSAI_i$ determined in Step 2.

Next, descriptions will be made on how to uniquely determine the first TS allocated to $f_i$ in each egress port $$\left(r_i^{opt}[k],\ k = 0, \ldots, \text{hop}_i^{opt}\right)$$

using the starting number of $$TDI^{r_i^{opt}[k]}\left(STDIN_i^{r_i^{opt}[k]}\right)$$

and the starting number of slot $$\left(SSN_i^{r_i^{opt}[k]}\right).$$

For example, as illustrated in FIG. 7, $$STDIN_i^{r_i^{opt}[k]} = 2,\ SSN_i^{r_i^{opt}[k]} = 3''$$

means that the third TS (marked with a red *) inside $$TCI^{r_i^{opt}[k]}$$

of the second $$TDI^{r_i^{opt}[k]}$$

is the first TS allocated to flow $f_i$ in the egress port $$r_i^{opt}[k].$$

For a flow $f_i$, the first TS allocated to $f_i$ in the egress port $$\left(r_i^{opt}[0]\right)$$

of the talker of $f_i$ is first determined.

As illustrated in FIG. 8, in order to determine the $$STDIN_i^{r_i^{opt}[0]}$$

and $$SSN_i^{r_i^{opt}[0]}$$

for flow $f_i$, the number of remaining time slots $$\left(RTS^{r_i^{opt}[0]}\right)$$

that have not been allocated in the $$TCI^{r_i^{opt}[0]}$$

must be checked, beginning from the first $$TDI^{r_i^{opt}[0]}.$$

When the $$RTS^{r_i^{opt}[0]}$$

satisfies Eq. 15, the first unallocated TS among the remaining TSs will be the first TS for flow $f_i$.

$$1 \le RTS^{r_i^{opt}[0]} \le NTSTC^{r_i^{opt}[0]} \quad \text{[Equation 15]}$$

Subsequently, the $$STDIN_i^{r_i^{opt}[0]}$$

and $$SSN_i^{r_i^{opt}[0]}$$

for $f_i$ can be determined; otherwise, the allocation should move to the next $$TDI^{r_i^{opt}[0]}$$

and check the number of remaining time slots. The same process is repeated until the first TS (marked with *) for flow $f_i$ in the egress port $$(r_i^{opt}[0])$$

of talker of $f_i$ is determined.

Subsequently, the first TSs allocated to flow $f_i$ in the egress ports of the following switches on the route of $f_i$ can be determined iteratively. It is noted that every time a message of $f_i$ is propagated forward to the egress port of the next-hop switch (e.g., $$r_i^{opt}[k+1]),$$

the position of TS allocated to flow $f_i$ is shifted by one.

When the value of the starting number of slot $$\left(SSN_i^{r_i^{opt}[k]}\right)$$

on the current egress port $$r_i^{opt}[k]$$

is less than the value of $$NTSTC^{r_i^{opt}[k]}$$

as defined in Step 2, this implies that a suitable TS for allocating to flow $f_i$ inside the same positional time-division interval $$TDI^{r_i^{opt}[k+1]}$$

on the egress port of the next switch $$(r_i^{opt}[k+1])$$

is available.

Therefore, the next TS in the same positional $$TDI^{r_i^{opt}[k+1]}$$

will be the first TS allocated to flow $f_i$ in the next-hop switch $$(r_i^{opt}[k+1]).$$

When the value of the starting number of slot $$\left(SSN_i^{r_i^{opt}}[k]\right)$$

on the current egress port $$r_i^{opt}[k]$$

is equal to $$NTSTC^{r_i^{opt}[k]},$$

this implies that no suitable TS for allocating to flow $f_i$ in the same positional time-division interval $$TDI^{r_i^{opt}[k+1]}$$

on the egress port of the next switch $$(r_i^{opt}[k+1])$$

is available.

Thus, the value of the starting number of $$TDI^{r_i^{opt}[k+1]}\left(STDIN_i^{r_i^{opt}[k+1]}\right)$$

on the egress port of the next switch $$r_i^{opt}[k+1]$$

should be increased by 1, and the value of the starting number of slot $$\left(SSN_i^{r_i^{opt}[k+1]}\right)$$

on the egress port of the next switch $$r_i^{opt}[k+1]$$

should become 1.

Subsequently, after determining the first TSs allocated to flow $f_i$ in the egress ports of the talker/switches on the route, the TSs allocated for $f_i$ at each egress port should be checked for time slot conflicts (i.e., time slot overlaps) with TSs allocated to all previous flows that already completed the time slot allocation.

When time slot overlaps exist, the value of the starting number of slot $$\left(SSN_i^{r_i^{opt}[k]}\right)$$

and the value of the starting number of $$TDI^{r_i^{opt}[k]}\left(STDIN_i^{r_i^{opt}[k]}\right)\left(k = 0, \ldots , \text{hop}_i^{opt}\right)$$

will be adjusted to the following first available TS as described earlier.

The time slot overlap check process is repeated until there are no time slot overlaps. When there is no more available TS, this indicates the "scheduling method" subprocedure fails to obtain the schedule results, and the currently selected routes for time-critical flows are not suitable. Thus, the routes for time-critical flows should be recomputed accordingly, and the "scheduling method" subprocedure should be rerun. After the first TSs allocation for $f_i$ are complete, the transmission instant $$\left(FMTI_i^{talker}\right)$$

of the first time-critical message from the egress port of its talker $$\left(\text{i.e., } r_i^{opt}[0]\right)$$

can be determined using Eq. 16.

$$FMTI_i^{talker} = \left(STDIN_i^{r_i^{opt}[0]} - 1\right) \times TDI^{r_i^{opt}[0]} + \left(NTCI^{r_i^{opt}[0]} + GBI^{r_i^{opt}[0]}\right) + \left(SSN_i^{r_i^{opt}[0]} - 1\right) \times TS. \quad \text{[Equation 16]}$$

Subsequently, at each egress port on the route of $f_i$, according to the time slot allocation interval $TSAI_i$ determined in Step 2, other time slots are allocated to $f_i$ repeatedly.

<Step 4>

This step derives the GCLs for TSN switches.

Step 2 indicates that scheduling is repeated every $TSAI_{max}$ seconds. Thus, the length $T_{cycle}$ of each GCL can be determined according to Eq. 17.

$$T_{cycle} = TSAI_{max}. \quad \text{[Equation 17]}$$

Next, the GCLs for the egress ports of switches is determined. The egress port $$r_i^{opt}[k]\left(k = 1, \ldots , \text{hop}_i^{opt}\right)$$

on the data propagation route of flow $f_i$(i=1, . . . , N) is considered as an example. When $$NTDI_i^k$$

is the number of time-division intervals $$\left(TDI^{r_i^{opt}[k]}s\right)$$

during $$T_{cycle}, NTDI_i^k$$

is determined according to Eq. 18.

$$NTDI_i^k = T_{cycle}/TDI^{r_i^{opt}[k]} \quad \text{[Equation 18]}$$

$T_{cycle}$ is a multiple of $$TDI^{r_i^{opt}[k]}.$$

Thus, $$NTDI_i^k$$

is an integer determined by Eq. 18.

As described above, port $$r_i^{opt}[k]$$

contains eight queues. Queues 6 and 7 are specialized for managing time-critical traffic, and an arbitrary queue (queue 6 or 7) will be assigned to time-critical messages, depending on the applications; other queues (queues 0-5) will be assigned to non-time-critical messages.

During $$NTCI^{r_i^{opt}[k]}$$

in the first $$TDI^{r_i^{opt}[k]},$$

non-time-critical traffic is designed to be transmitted from the egress port $$r_i^{opt}[k].$$

Thus, the gates of queues 6-7 are set as closed, and the gates of queues 0-5 are set as open. According to the gate states of the eight queues, the first gate operation (whose "GateOperationName" value is "Operation 0") is set as shown in Table 2 in the GCL for port $$r_i^{opt}[k].$$

During $$GBI{r_i^{opt}}^{[k]}$$

in the first $$TDI{r_i^{opt}}^{[k]},$$

all gates are set as closed, and the second gate operation (whose GateOperationName value is "Operation 1") is set in the GCL accordingly. During $$TDI{r_i^{opt}}^{[k]}$$

in the first $$TDI{r_i^{opt}}^{[k]},$$

time-critical traffic is designed to be transmitted from port $$r_i^{opt}[k].$$

Thus, the gates of queues 6-7 are set as open, and the gates of queues 0-5 are set as closed. The third gate operation (whose GateOperationName value is "Operation 2") is set in the GCL accordingly.

The first three gate operations will be repeated afterward; the "GateStates" and "TimeInterval" values of each operation are shown in Table 2. The proposed method transmits as many time-critical flows as possible when the gates of queues 6 and 7 are open, and the number of guard bands and gate opening events can be drastically reduced.

Thus, the number of entries in the GCL can be constrained not to exceed the maximum value, i.e., 1024 entries as provided in [19]. Moreover, the calculated GCLs are succinct, ensuring that the calculated GCLs can be easily implemented in real-world TSN switches. For a TSN talker, it does not transmit non-time-critical traffic. The TSN talker transmits the first time-critical message of a flow $f_i$ at the instant given in Eq. (16), and the transmission will be repeated with an interval of $TSAI_i$. The states of eight gates can always be open.

TABLE 2

| GateOperationName | | GateStates | TimeInterval |
|---|---|---|---|
| Repeat $NTD_i^k$ times: | Operation 0 | 0011 1111 | $NTCIr_i^{opt[k]}$ |
| | Operation 1 | 0000 0000 | $GBIr_i^{opt[k]}$ |
| | Operation 2 | 1100 0000 | $TCIr_i^{opt[k]}$ |

FIG. 9 illustrates the process of joint routing and scheduling in the industrial automation system where TSN network is applied according to the present invention.

The process illustrated in FIG. 9 is executed in a control system of an industrial automation system or a separate computer system, an optimized route and scheduling result for each flow generated through the process are applied to the industrial automation system.

Specifically, the process illustrated in FIG. 9 is to optimize the operation management of the industrial automation system, and the process will be executed by the control system of the industrial automation system or a processor of a separate computer system. Hereinbelow, descriptions will be made by assuming that the process is executed by the processor.

Referring to FIG. 9, the joint routing and scheduling method according to the present invention are largely divided into a routing step (S104) and scheduling step (S106).

First, network topology, specification of N traffic flows, and each traffic flow are input to the processor of the industrial automation system (S100).

Next, the processor generate a set of valid routes including K candidate routes with respect to each traffic flow using the specification of N traffic flows. (S102)

Subsequently, the processor, based on the remaining bandwidths of the entire links that belong to the set of valid routes of each traffic flow and entire candidate routes, performs a routing step (S104). At this time, the processor, using the function where the time and remaining bandwidths necessary for the message to be transmitted without interruption from the talker device to the listener device are variables, determines a route where the function value becomes the maximum as an optimized route.

Lastly, the processor, based on the optimized route and specification of the all N traffic flows determined at the routing step, performs a scheduling step that determines the Gate Control List of the switch on the message transmission instant and routes for each traffic.

The scheduling step (S106) includes a process that determines the length of the time division interval (TDI) and time slot (TS) for the time division multiplexing, a process that determines the number of time slots allocated to the time-critical data interval, a process that calculates the length of the time-critical data interval and the length of the non-time-critical data interval, and a process that determines the time-critical message transmission instant by allocating the determined time slots to each traffic flow.

Additionally, in the process of determining the time-critical message transmission instant, when a remaining time slot (RTS) exists starting from the first time divisional interval (TDI) of each egress port for each flow, the start number of the corresponding time-division interval (TDi) and the starat number of the time slot (TS) are determined and the start number of the time-division interval of entire egress ports in each flow is determined.

Next, after performing the scheduling step, the processor determines whether a scheduling result can be output (S108). When the scheduling result can be output, the processor determines the message transmission time and the gate list (GCL) of the switch, and when the scheduling result cannot be output, that is, when the message transmission instant cannot be determined, a next step is performed.

That is, the processor determines whether an optimized route is used for all candidate routes included in the valid route set for each traffic flow (S112).

When determined that an optimized route is not used for all candidate routes, the processor returns to the routing step (S104) to determine a next second best route as the optimized route for each traffic flow, and then performs the scheduling step (S106).

When determined that an optimized route is used for all candidate routes, the processor determines whether the valid route set is identical to the previous valid route set (S114).

When determined that the valid route sets are not identical, the processor returns to the candidate route generation step (S102) and generates a new valid route set to perform the routing step (S104) and scheduling step (S106), and when determined that the valid route sets are identical, the processor outputs a network unstable state (S116).

Performance Evaluation

1. Validity Evaluation

In order to examine the validity of the joint routing and scheduling method according to the present invention, a simulation experiment was implemented in OMNET++, based on the simulation model that has been researched and developed.

The simulation experiment was conducted on a random synthetic test scenario. As illustrated in FIG. 10, the TSN network included nine TSN switches ($SW_1$ to $SW_9$), twenty-seven end stations ($ES_1$ to $ES_{27}$) which were attached to the TSN switches, thirty-four time-critical traffic flows ($f_1$ to $f_{34}$), and two non-time-critical traffic flows ($f_{35}$ and $f_{36}$).

The flow specifications are listed in Table 3. Table 3 lists the specification of 36 flows, and here, TC represents time-critical, and NTC represents non-time-critical. The adopted TSN network parameters are listed in Table 4. The combination of weights (0.5, 0.5) was adopted for the metrics $$R_i^j \cdot D_{phy}^i \text{ and } R_i^j \cdot B.$$

TABLE 3

| Flow | Type | Talker | Listener | Period $pd_i$ | $\varphi_i$ | Size |
|---|---|---|---|---|---|---|
| $f_1$, $f_2$ | TC | $ES_2$ | $ES_{14}$ | 600 us | 600 us | MTU |
| $f_3$, $f_4$ | TC | $ES_3$ | $ES_7$ | 300 us | 300 us | MTU |
| $f_5$, $f_6$ | TC | $ES_9$ | $ES_{14}$ | 150 us | 150 us | MTU |
| $f_7$-$f_{10}$ | TC | $ES_9$ | $ES_{13}$ | 300 us | 300 us | MTU |
| $f_{11}$-$f_{18}$ | TC | $ES_8$ | $ES_{14}$ | 600 us | 600 us | MTU |
| $f_{19}$ | TC | $ES_1$ | $ES_{27}$ | 300 us | 300 us | MTU |
| $f_{20}$ | TC | $ES_{26}$ | $ES_{20}$ | 300 us | 300 us | MTU |
| $f_{21}$, $f_{22}$ | TC | $ES_{24}$ | $ES_{21}$ | 150 us | 150 us | MTU |
| $f_{23}$-$f_{27}$ | TC | $ES_{23}$ | $ES_{21}$ | 300 us | 300 us | MTU |
| $f_{28}$-$f_{32}$ | TC | $ES_{22}$ | $ES_{21}$ | 600 us | 600 us | MTU |
| $f_{33}$ | TC | $ES_{19}$ | $ES_{15}$ | 300 us | 300 us | MTU |
| $f_{34}$ | TC | $ES_7$ | $ES_{23}$ | 300 us | 300 us | MTU |
| $f_{35}$ | NTC | $ES_4$ | $ES_{11}$ | sporadic | — | MTU |
| $f_{36}$ | NTC | $ES_5$ | $ES_{12}$ | sporadic | — | MTU |

TABLE 4

| Parameter | Value |
|---|---|
| Network link speed ($NL_{spd}$) | 1 Gbps |
| Processing delay of a switch ($d_{proc}$) | 1 us |
| Length of a physical link ($L_{link}$) | 10 m |
| Propagation speed of the electrical signal in a physical link ($ES_{prop}$) | $2 \times 10^8$ m/s |
| Propagation delay in a physical link ($d_{prop} = L_{link}/ES_{prop}$) | 0.05 us |

Next, the network topology, the flow specifications, and the number of routes to be computed for each time-critical flow (K, the initial value was set as 3) were inputted to the joint routing and scheduling method.

First, the optimal routes for time-critical flows were computed based on the optimal routing method as described above, as listed in Table 5. Then, according to Step 1 of the scheduling method as described above, the length of time-division interval was determined as 150 us based on Eqs. 5 and 8. The length of guard band interval was determined as 12.24 us, and the length of a time slot TS was determined as 13.29 us based on Eq. 9.

According to Step 2, the time slot allocation intervals ($TSAI_i$ values) of the time-critical traffic flows were determined as [$TSAI_1$, $TSAI_2$, . . . , $TSAI_{34}$]=[600, 600, 300, 300, 150, 150, 300, 300, 300, 300, 600, 600, 600, 600, 600, 600, 600, 600, 300, 300, 150, 150, 300, 300, 300, 300, 300, 600, 600, 600, 600, 600, 300, 300 us] based on Eq. 10.

The maximum time slot allocation interval ($TSAI_{max}$) were determined as 600 us via Eq. 11. The number of time slots allocated in a time-critical data interval was determined as 8 using Eq. 12. The length of time-critical data interval was determined as 106.32 us via Eq. 13. The length of non-time-critical data interval was determined as 31.44 us via Eq. 14.

According to Step 3, the transmission instants $$\left(FMTI_i^{talker}\right)$$

of the first frame of each time-critical traffic flow from its TSN talker were determined as $$FMTI_1^{talker}, FMTI_2^{talker}, \ldots, FMTI_{34}^{talker}] = [96.84, 110.13, 43.68, 56.97, 43.68, 56.97, 70.26, 83.55, 96.84, 110.13, 220.26, 233.55, 246.84, 260.13, 273.42, 286.71, 423.42, 436.71, 43.68, 56.97, 43.68, 56.97, 83.55, 96.84, 110.13, 123.42, 136.71, 220.26, 233.55, 246.84, 260.13, 273.42, 43.68, 43.68\ us].$$

According to Step 4, the GCLs for the TSN switches were derived. Because of the limited space, the GCL for the egress port [$SW_1$, $SW_2$] was presented as an example. The number of time-division intervals during $T_{cycle}$ was determined as 4 via Eq. 18. According to Table 2, the GCL for the egress port [SW1, SW2] was derived, as described in Table 6. The GCLs for other egress ports of TSN switches were similarly determined. Up to now, the routes for flows and the schedule results had been obtained.

TABLE 5

| Flow ID | Route |
|---|---|
| $f_1$ | $ES_2 \rightarrow SW_1 \rightarrow SW_2 \rightarrow SW_3 \rightarrow SW_4 \rightarrow SW_5 \rightarrow ES_{14}$ |
| $f_2$ | $ES_2 \rightarrow SW_1 \rightarrow SW_2 \rightarrow SW_3 \rightarrow SW_4 \rightarrow SW_5 \rightarrow ES_{14}$ |
| $f_3$ | $ES_3 \rightarrow SW_1 \rightarrow SW_2 \rightarrow SW_3 \rightarrow ES_7$ |
| $f_4$ | $ES_3 \rightarrow SW_1 \rightarrow SW_2 \rightarrow SW_3 \rightarrow ES_7$ |
| $f_5$ | $ES_9 \rightarrow SW_3 \rightarrow SW_4 \rightarrow SW_5 \rightarrow ES_{14}$ |
| $f_6$ | $ES_9 \rightarrow SW_3 \rightarrow SW_4 \rightarrow SW_5 \rightarrow ES_{14}$ |
| $f_7$ | $ES_9 \rightarrow SW_3 \rightarrow SW_4 \rightarrow SW_5 \rightarrow ES_{13}$ |
| $f_8$ | $ES_9 \rightarrow SW_3 \rightarrow SW_4 \rightarrow SW_5 \rightarrow ES_{13}$ |
| $f_9$ | $ES_9 \rightarrow SW_3 \rightarrow SW_4 \rightarrow SW_5 \rightarrow ES_{13}$ |
| $f_{10}$ | $ES_9 \rightarrow SW_3 \rightarrow SW_4 \rightarrow SW_5 \rightarrow ES_{13}$ |
| $f_{11}$ | $ES_8 \rightarrow SW_3 \rightarrow SW_4 \rightarrow SW_5 \rightarrow ES_{14}$ |
| $f_{12}$ | $ES_8 \rightarrow SW_3 \rightarrow SW_4 \rightarrow SW_5 \rightarrow ES_{14}$ |
| $f_{13}$ | $ES_8 \rightarrow SW_3 \rightarrow SW_4 \rightarrow SW_5 \rightarrow ES_{14}$ |
| $f_{14}$ | $ES_8 \rightarrow SW_3 \rightarrow SW_4 \rightarrow SW_5 \rightarrow ES_{14}$ |
| $f_{15}$ | $ES_8 \rightarrow SW_3 \rightarrow SW_4 \rightarrow SW_5 \rightarrow ES_{14}$ |
| $f_{16}$ | $ES_8 \rightarrow SW_3 \rightarrow SW_4 \rightarrow SW_5 \rightarrow ES_{14}$ |
| $f_{17}$ | $ES_8 \rightarrow SW_3 \rightarrow SW_4 \rightarrow SW_5 \rightarrow ES_{14}$ |
| $f_{18}$ | $ES_8 \rightarrow SW_3 \rightarrow SW_4 \rightarrow SW_5 \rightarrow ES_{14}$ |
| $f_{19}$ | $ES_1 \rightarrow SW_1 \rightarrow SW_9 \rightarrow ES_{27}$ |
| $f_{20}$ | $ES_{26} \rightarrow SW_9 \rightarrow SW_8 \rightarrow SW_7 \rightarrow ES_{20}$ |
| $f_{21}$ | $ES_{24} \rightarrow SW_8 \rightarrow SW_7 \rightarrow ES_{21}$ |
| $f_{22}$ | $ES_{24} \rightarrow SWs \rightarrow SW_7 \rightarrow ES_{21}$ |
| $f_{23}$ | $ES_{23} \rightarrow SW_8 \rightarrow SW_7 \rightarrow ES_{21}$ |
| $f_{24}$ | $ES_{23} \rightarrow SW_8 \rightarrow SW_7 \rightarrow ES_{21}$ |
| $f_{25}$ | $ES_{23} \rightarrow SW_8 \rightarrow SW_7 \rightarrow ES_{21}$ |
| $f_{26}$ | $ES_{23} \rightarrow SW_8 \rightarrow SW_7 \rightarrow ES_{21}$ |
| $f_{27}$ | $ES_{23} \rightarrow SW_8 \rightarrow SW_7 \rightarrow ES_{21}$ |
| $f_{28}$ | $ES_{22} \rightarrow SW_8 \rightarrow SW_7 \rightarrow ES_{21}$ |
| $f_{29}$ | $ES_{22} \rightarrow SW_8 \rightarrow SW_7 \rightarrow ES_{21}$ |
| $f_{30}$ | $ES_{22} \rightarrow SW_8 \rightarrow SW_7 \rightarrow ES_{21}$ |
| $f_{31}$ | $ES_{22} \rightarrow SW_8 \rightarrow SW_7 \rightarrow ES_{21}$ |
| $f_{32}$ | $ES_{22} \rightarrow SW_8 \rightarrow SW_7 \rightarrow ES_{21}$ |
| $f_{33}$ | $ES_{19} \rightarrow SW_7 \rightarrow SW_6 \rightarrow SW_5 \rightarrow ES_{15}$ |
| $f_{34}$ | $ES_7 \rightarrow SW_3 \rightarrow SW_8 \rightarrow ES_{23}$ |
| $f_{35}$ | $ES_4 \rightarrow SW_2 \rightarrow SW_3 \rightarrow SW_4 \rightarrow ES_{11}$ |
| $f_{36}$ | $ES_5 \rightarrow SW_2 \rightarrow SW_3 \rightarrow SW_4 \rightarrow ES_{12}$ |

TABLE 6

| GateOperationName | GateStates | TimeInterval (μs) |
|---|---|---|
| Operation 0 | 0011 1111 | 31.44 |
| Operation 1 | 0000 0000 | 12.24 |
| Operation 2 | 1100 0000 | 106.32 |
| Operation 3 | 0011 1111 | 31.44 |
| Operation 4 | 0000 0000 | 12.24 |
| Operation 5 | 1100 0000 | 106.32 |
| Operation 6 | 0011 1111 | 31.44 |
| Operation 7 | 0000 0000 | 12.24 |
| Operation 8 | 1100 0000 | 106.32 |
| Operation 9 | 0011 1111 | 31.44 |
| Operation 10 | 0000 0000 | 12.24 |
| Operation 11 | 1100 0000 | 106.32 |

The existing studies (e.g., SMT-based methods, heuristic algorithms, and ILP-based methods) did not provide their source codes, thus ruling out the comparison of schedule results with them. In order to examine the performance of the proposed method, a benchmark (i.e., same network topology and flow specifications, but without using the proposed method) was established. The routes of the flows were computed using the shortest path algorithm; the gates of egress ports of TSN switches were always "open", and talkers of time-critical traffic flows started to transmit the first time-critical message at instant 0. Subsequently, the simulation experiments with and without using the proposed method were performed based on the configurations mentioned above. The simulation experiments were run for 30 s. It is noted that the period of time-critical flows was "us" level. For example, the period of flow $f_5$ was 150 us, which indicated that 200,000 messages would be transmitted during the simulation time. Thus, 30 s was sufficient for the simulation experiments.

Table 7 lists the maximum, minimum, average, and jitter values of the measured e2e delays of each flow for the cases with and without using the proposed method. Herein, jitter is defined as the deviation in the measured e2e delay of two subsequent messages of a flow.

First, the measured e2e delays of time-critical messages of time-critical traffic flows were compared between the two cases. It can be observed that in the case without using the proposed method, the maximum allowable e2e delay requirements ($\varphi_i$ values) of some time-critical traffic flows (i.e., $f_5$, $f_6$, $f_{21}$ and $f_{22}$) were not satisfied, and many e2e delays fluctuated.

Whereas in the case with using the proposed method, the e2e delays of all messages of time-critical traffic flows were deterministic, conformed to the computed schedule results, and satisfied their maximum allowable e2e delay requirements ($\varphi_i$ values).

Then, the measured e2e delays of messages of non-time-critical flows (i.e., $f_{35}$ and $f_{36}$) were compared between the two cases. It is noted that $f_{35}$ and $f_{36}$ did not have any real-time requirements. It can be verified that the maximum, minimum, and average values of the measured e2e delay were significantly reduced in the case with using the method of the present invention. The simulation results indicated that the method of the present invention is valid. The method of the present invention can satisfy the maximum allowable e2e delay requirements of the time-critical traffic flows, even if time-critical and non-time-critical traffic flows coexist within one network.

TABLE 7

| | e2e delay without using the method (μs) | | | | e2e delay with using the method (μs) | | | | |
|---|---|---|---|---|---|---|---|---|---|
| Flow | Maximum | Minimum | Average | Jitter | Maximum | Minimum | Average | Jitter | $\varphi_i$ (μs) |
| $f_1$ | 150.85 | 126.18 | 130.07 | 24.67 | 122.42 | 122.42 | 122.42 | 0 | 600 |
| $f_2$ | 187.86 | 175.52 | 177.47 | 12.34 | 122.42 | 122.42 | 122.42 | 0 | 600 |
| $f_3$ | 75.78 | 52.16 | 59.22 | 14.12 | 52.16 | 52.16 | 52.16 | 0 | 300 |
| $f_4$ | 100.45 | 64.50 | 77.72 | 26.45 | 52.16 | 52.16 | 52.16 | 0 | 300 |
| $f_5$ | 224.86 | 52.16 | 119.52 | 87.34 | 52.16 | 52.16 | 52.16 | 0 | 150 |
| $f_6$ | 237.2 | 64.50 | 131.85 | 87.34 | 52.16 | 52.16 | 52.16 | 0 | 150 |
| $f_7$ | 64.50 | 52.16 | 58.33 | 12.34 | 52.16 | 52.16 | 52.16 | 0 | 300 |
| $f_8$ | 89.17 | 64.50 | 76.83 | 24.67 | 52.16 | 52.16 | 52.16 | 0 | 300 |
| $f_9$ | 113.84 | 76.83 | 95.34 | 37.01 | 52.16 | 52.16 | 52.16 | 0 | 300 |
| $f_{10}$ | 150.85 | 89.17 | 119.03 | 59.73 | 95.84 | 95.84 | 95.84 | 0 | 300 |
| $f_{11}$ | 52.16 | 52.16 | 52.16 | 0 | 52.16 | 52.16 | 52.16 | 0 | 600 |
| $f_{12}$ | 76.83 | 76.83 | 76.83 | 0 | 52.16 | 52.16 | 52.16 | 0 | 600 |
| $f_{13}$ | 101.50 | 101.50 | 101.50 | 0 | 52.16 | 52.16 | 52.16 | 0 | 600 |

TABLE 7-continued

| | e2e delay without using the method (μs) | | | | e2e delay with using the method (μs) | | | | |
|---|---|---|---|---|---|---|---|---|---|
| Flow | Maximum | Minimum | Average | Jitter | Maximum | Minimum | Average | Jitter | $\varphi_i$ (μs) |
| $f_{14}$ | 138.51 | 126.18 | 136.56 | 12.34 | 95.84 | 95.84 | 95.84 | 0 | 600 |
| $f_{15}$ | 163.18 | 163.18 | 163.18 | 0 | 95.84 | 95.84 | 95.84 | 0 | 600 |
| $f_{16}$ | 187.86 | 175.52 | 185.91 | 12.34 | 95.84 | 95.84 | 95.84 | 0 | 600 |
| $f_{17}$ | 200.19 | 200.19 | 200.19 | 0 | 95.84 | 95.84 | 95.84 | 0 | 600 |
| $f_{18}$ | 212.53 | 212.53 | 212.53 | 0 | 95.84 | 95.84 | 95.84 | 0 | 600 |
| $f_{19}$ | 38.87 | 38.87 | 38.87 | 0 | 38.87 | 38.87 | 38.87 | 0 | 300 |
| $f_{20}$ | 88.21 | 75.88 | 82.05 | 12.34 | 52.16 | 52.16 | 52.16 | 0 | 300 |
| $f_{21}$ | 174.57 | 38.87 | 78.47 | 68.83 | 38.87 | 38.87 | 38.87 | 0 | 150 |
| $f_{22}$ | 186.90 | 51.21 | 106.23 | 99.67 | 38.87 | 38.87 | 38.87 | 0 | 150 |
| $f_{23}$ | 162.23 | 112.89 | 137.56 | 49.34 | 38.87 | 38.87 | 38.87 | 0 | 300 |
| $f_{24}$ | 51.21 | 38.87 | 45.04 | 12.34 | 38.87 | 38.87 | 38.87 | 0 | 300 |
| $f_{25}$ | 75.88 | 63.54 | 69.71 | 12.34 | 38.87 | 38.87 | 38.87 | 0 | 300 |
| $f_{26}$ | 112.89 | 88.21 | 100.55 | 24.67 | 82.55 | 82.55 | 82.55 | 0 | 300 |
| $f_{27}$ | 137.56 | 100.55 | 119.05 | 37.01 | 82.55 | 82.55 | 82.55 | 0 | 300 |
| $f_{28}$ | 38.87 | 38.87 | 38.87 | 0 | 38.87 | 38.87 | 38.87 | 0 | 600 |
| $f_{29}$ | 63.54 | 63.54 | 63.54 | 0 | 38.87 | 38.87 | 38.87 | 0 | 600 |
| $f_{30}$ | 100.55 | 100.55 | 100.55 | 0 | 38.87 | 38.87 | 38.87 | 0 | 600 |
| $f_{31}$ | 125.22 | 125.22 | 125.22 | 0 | 38.87 | 38.87 | 38.87 | 0 | 600 |
| $f_{32}$ | 149.89 | 149.89 | 149.89 | 0 | 82.55 | 82.55 | 82.55 | 0 | 600 |
| $f_{33}$ | 52.16 | 52.16 | 52.16 | 0 | 52.16 | 52.16 | 52.16 | 0 | 300 |
| $f_{34}$ | 38.87 | 38.87 | 38.87 | 0 | 38.87 | 38.87 | 38.87 | 0 | 300 |
| $f_{35}$ | 273.16 | 260.85 | 263.27 | 12.30 | 175.52 | 162.26 | 164.86 | 13.26 | — |
| $f_{36}$ | 273.16 | 260.85 | 263.29 | 12.30 | 175.52 | 162.26 | 164.88 | 13.26 | — |

2. Computational Time Evaluation

1) Computational Time Vs Traffic Load

The computational time of the proposed method has been evaluated for different traffic loads by adjusting the number of flows. A typical realistic network, that is, the Orion crew exploration vehicle (CEV) network commonly adopted in the existing studies was selected as the test topology, as illustrated in FIG. 11.

During the experiments, we varied the number of flows, ranging from 500 to 4000 flows. Talkers and listeners of all flows were randomly distributed among the end stations. The periods of flows were selected randomly from 8, 16, and 32 ms. The method of the present invention was implemented using C++, and all experiments were conducted on a PC with Intel Core i7-8559 @ 2.70 GHz CPU and 16 GB RAM. Table 8 indicates the computational times in the scenario of different numbers of flows. It can be observed that the computational times increased when the number of flows to be scheduled increased. The computational times for up to 4000 flows in the realistic industrial network topology were still at the sub-second level, indicating that the method of the present invention has perfect scalability.

TABLE 8

| | Computational times of the proposed method |
|---|---|
| 500 flows | 19.96 ms |
| 1000 flows | 42.49 ms |
| 1500 flows | 60.44 ms |
| 2000 flows | 87.96 ms |
| 2500 flows | 120.46 ms |
| 3000 flows | 168.8 ms |
| 3500 flows | 214.59 ms |
| 4000 flows | 261.47 ms |

2) Computational Time Vs Network Size

The computational time of the method of the present invention has been evaluated for different network sizes by adjusting the number of switches and end stations. During the experiments, the random network topologies were adopted, and we varied the number of switches from 3 to 21 switches. Each switch was connected with the same number of end-stations. The number of flows was 4000, and the periods of flows were selected randomly from 8, 16, and 32 ms. Talkers and listeners of all flows were randomly distributed among the end stations. The results in Table 9 indicates that the computational time of the proposed method increased almost linearly when the network size increased. The computational time for 4000 flows in the 21-switches network was still sub-second level, which also indicated that the scalability of the method of the present invention is excellent.

TABLE 9

| | Computational times |
|---|---|
| 3 switches, 15 end stations | 203.78 ms |
| 6 switches, 30 end stations | 274.32 ms |
| 9 switches, 45 end stations | 350.72 ms |
| 12 switches, 60 end stations | 350.76 ms |
| 15 switches, 75 end stations | 359.0 ms |
| 18 switches, 90 end stations | 400.0 ms |
| 21 switches, 105 end stations | 437.26 ms |

3) Computational Time Comparison

The computational times of the joint routing and scheduling method of the present invention were compared with the computational times of several recent approaches, wherein, the DoC-Aware Iterative Routing and Scheduling (DA/IRS) approach was showed to be faster than other two ILP-based approaches. As a result, the comparison with these two ILP-based approaches was skipped.

The network topology, number of switches and end stations, and the number of flows conformed with the existing studies, as indicated in Tables 10, 11, and 12. Talkers and listeners were randomly distributed among the end stations. As the existing studies did not provide the source code, the computational times were directly obtained from the studies.

First, the computational times were compared to those of the ILP-based approach. The network topology adopted the random graph (Erdos-Renyi network model), the number of switches is eight, and each switch connects three end stations on average. The periods of flows were selected randomly from 1, 2, 4, and 8 ms, consistent with the flow periods in existing studies. Table 10 compared the computational times for different numbers of flows. The method of the present invention requires only 2.83% computational time of the ILP-based approach for the 2-flow case in Table 10 and even lower for other cases.

TABLE 10

| | ILP-based approach [30] | Ours |
|---|---|---|
| 2 flows | 0.12 s | 3.4 ms |
| 3 flows | 0.45 s | 3.5 ms |
| 4 flows | 1.71 s | 3.7 ms |
| 5 flows | 4.54 s | 3.8 ms |
| 6 flows | 6.25 s | 3.9 ms |
| 7 flows | 10.13 s | 4.1 ms |
| 8 flows | 14.07 s | 4.2 ms |
| 9 flows | 20.52 s | 4.3 ms |
| 10 flows | 27.24 s | 4.5 ms |
| 11 flows | 32.17 s | 4.6 ms |
| 12 flows | 54.92 s | 4.7 ms |
| 13 flows | 58.74 s | 4.8 ms |
| 14 flows | 86.0 s | 5.0 ms |
| 15 flows | 112.84 s | 5.2 ms |
| 16 flows | 104.51 s | 5.3 ms |
| 17 flows | 120.71 s | 5.4 ms |
| 18 flows | 149.06 s | 5.6 ms |
| 19 flows | 179.70 s | 5.8 ms |
| 20 flows | 241.87 s | 5.9 ms |
| 21 flows | 254.20 s | 6.0 ms |
| 22 flows | 370.90 s | 6.2 ms |
| 23 flows | 400.43 s | 6.4 ms |
| 24 flows | 420.31 s | 6.6 ms |
| 25 flows | 449.60 s | 6.7 ms |
| 26 flows | 643.39 s | 6.9 ms |
| 27 flows | 543.48 s | 7.3 ms |
| 28 flows | 937.55 s | 7.6 ms |
| 29 flows | 1020.50 s | 8.0 ms |
| 30 flows | 1056.51 s | 8.3 ms |

Next, the computational times were compared to those of the DA/IRS approach. The number of switches and end stations and the number of flows conformed with the existing studies. The periods of the flows were selected from 5 ms and 10 ms. Table 11 indicates the comparison of the computational times. The DA/IRS approach was implemented in MATLAB. Considering the performance gap between the MATLAB and C/C++ implementations (20 times faster in C/C++), the computational time of the DA/IRS approach was shortened by 20 times, as indicated in the column labeled "DA/IRS (20×)" in Table 11.

Compared with the DA/IRS approach, the method of the present invention requires only 0.13% computational time of the DA/IRS approach (i.e., approximately 770-fold faster) for the 20-flow scenario in Table 14, and even lower for other scenarios.

TABLE 11

| | DAARS [31] | DA/IRS (20x) | Ours |
|---|---|---|---|
| 20 flows | 30 s | 1.5 s | 1.94 ms |
| 25 flows | 50 s | 2.5 s | 2.1 ms |
| 30 flows | 60 s | 3 s | 2.47 ms |
| 35 flows | 70 s | 3.5 s | 2.72 ms |
| 40 flows | 80 s | 4 s | 2.98 ms |
| 50 flows | 90 s | 4.5 s | 3.3 ms |
| 60 flows | 88 s | 4.4 s | 3.55 ms |

Then, the computational times were compared to those of the hybrid genetic algorithm (HGA). The network topology was the ring topology, the number of switches is ten, and each switch connects five end stations. The periods of flows were selected randomly from 2, 4, and 8 ms.

Table 12 compared the computational times for different numbers of flows. The method of the present invention requires only 0.069% computational time of the HGA-based approach for the 10-flow case in Table 12 and even lower for other cases.

TABLE 12

| | HGA-based approach [32] | Ours |
|---|---|---|
| 10 flows | 10 s | 6.9 ms |
| 20 flows | 25 s | 8.4 ms |
| 30 flows | 50 s | 10.0 ms |
| 40 flows | 90 s | 11.7 ms |
| 50 flows | 120 s | 13.7 ms |
| 60 flows | 180 s | 15.6 ms |
| 70 flows | 220 s | 16.9 ms |
| 80 flows | 300 s | 19.3 ms |
| 90 flows | 380 s | 22.1 ms |
| 100 flows | 470 s | 26.5 ms |

The IEEE TSN Task Group is standardizing a real-time communication solution for applications in industrial domains that can satisfy the communication requirements of IIoT. However, the routing and scheduling methods are ignored by the current IEEE 802.1 standard. In the present invention, a joint routing and scheduling method to obtain the routes for time-critical flows and construct the schedules has been proposed.

The simulation experiments were performed to examine the validity of the method of the present invention. The simulation results indicated that the method of the present invention could satisfy the real-time requirements of time-critical traffic. Furthermore, the scalability of the proposed method was evaluated from the perspective of the number of flows and the network size. The experimental results illustrated that the computational times for routing and scheduling up to 4000 flows in a realistic industrial network topology were in the sub-second level, the computational times for routing and scheduling 4000 flows in the random networks with up to twenty-one switches. And 155 end stations were also in the sub-second level, which indicated the perfect scalability of the method of the present invention. In addition, evaluation of the computational times required to calculate routes and schedule in comparison with those of the ILP-based approach, DA/IRS approach, and HGA-based approach indicated the method of the present invention is much faster and requires only 2.83%, 0.13%, and 0.069% of the computational time of the three approaches, respectively.

The above descriptions merely explain the present invention as an example, and various modification may be possible by an ordinary skill in the art in the technical field to which the present invention belongs without departing from the spirit of the present invention.

Accordingly, the embodiments of the specification in the present invention do not limit the scope of the present invention. The scope of the present invention should be interpreted by the claims below, and all technologies within the equivalent range should be interpreted to be included in the present invention.

POSSIBILITY OF INDUSTRIAL USAGE

The present invention may be widely applied to the industrial automation system.

What is claimed is:

1. A method performed in a control apparatus of an industrial automation system, the method comprising:

an initial input step of receiving inputs of network topology, a specification of N traffic flows, N being a positive integer and an initial candidate route number (K), K being a positive integer;

a candidate route generation step of generating a candidate route set including K candidate route(s) for each traffic flow using the specification of N traffic flows;

a routing step of determining an optimized route of each traffic flow based on a remaining bandwidth of entire links that belong to a set of valid routes and entire candidate routes of each traffic flow; and a scheduling step of determining a gate control list of switches on a message transmission instant and a route for each traffic flow based on the optimized route and the specification of each of all N traffic flows, wherein, when determining a me a e transmitting instant fails, determining whether all candidate routes included in the set of the valid routes of each traffic flow are used as the optimized route;

when determined that not all the routes are used as the optimized route determining a suboptimal route as the optimized route and then performing the scheduling step; and when determined that all the routes is used as the optimized route, determining whether the set of the valid routes is identical to a previous set of valld routes, when determined not to be identical, generating a new set of valid routes and then performing the routing step and the scheduling step, and when determined to be identical, outputting a network unstable state.

2. The method according to claim 1, wherein the routing step is characterized in determining a route in which a value of a function where a time and remaining bandwidth required for a message to be transmitted from a caller device to a listener device without interruption are parameters is maximized as the optimized route.

3. The method according to claim 1, wherein the method is characterized in that the scheduling step includes:

a step of determining a length of time division interval (TDI) and time slot (TS) for time division multiplexing;

a step of determining time slot allocation interval (TSAI) for each traffic flow;

a step of determining a time slot number allocated to a time-critical data interval;

a step of computing a length of an interval for the non-time-critical data and a length of an interval for the time-critical data; and a step of determining a time-critical message transmission instant by allocating determined time slots to each traffic flow.

4. The method according to claim 3, wherein the method is characterized in that when a remaining time slot (RTS) exists starting from a first time divisional interval (TDI) of each egress port for each flow, the step of determining the time-critical message transmission instant determines the start number of the time-division interval of entire egress ports in each flow by determining the start number of the corresponding time-division interval (TDi) and the starat number of the time slot (TS), and then determines the time-critical message transmission instant for all flows.

* * * * *